US010444352B2

(12) United States Patent
Martin

(10) Patent No.: US 10,444,352 B2
(45) Date of Patent: Oct. 15, 2019

(54) APPARATUS FOR SOUNDING THE ATMOSPHERE AND METHOD

(71) Applicant: Windbidco Pty Ltd, East Malvern (AU)

(72) Inventor: Andrew L. Martin, Ferny Creek (AU)

(73) Assignee: Windbidco Pty Ltd, East Malvern (AU)

(*) Notice: Subject to any disclaimer, the term of this patent is extended or adjusted under 35 U.S.C. 154(b) by 193 days.

(21) Appl. No.: 15/524,239

(22) PCT Filed: Nov. 5, 2015

(86) PCT No.: PCT/AU2015/000669
§ 371 (c)(1),
(2) Date: May 3, 2017

(87) PCT Pub. No.: WO2016/070231
PCT Pub. Date: May 12, 2016

(65) Prior Publication Data
US 2017/0322307 A1 Nov. 9, 2017

(30) Foreign Application Priority Data
Nov. 6, 2014 (AU) .............................. 2014904468

(51) Int. Cl.
*G01S 15/88* (2006.01)
*G01S 7/521* (2006.01)
*H04R 1/28* (2006.01)

(52) U.S. Cl.
CPC ............ *G01S 15/885* (2013.01); *G01S 7/521* (2013.01); *H04R 1/2803* (2013.01)

(58) Field of Classification Search
CPC ........... G01M 7/027; G01N 1/42; G01N 3/04; G01N 3/08; G01N 3/32; G01N 2203/0005; G01N 2203/0222; G01N 2203/0226; G01N 2203/0228
USPC ......................................................... 73/663
See application file for complete search history.

(56) References Cited

U.S. PATENT DOCUMENTS 2,916,101 A * 12/1959 Naman ............. F16L 55/02754
181/224
4,316,522 A * 2/1982 Hirschorn ............. F04D 29/664
181/224
(Continued)

FOREIGN PATENT DOCUMENTS

EP 1277065 1/2003
EP 1896870 3/2008
(Continued)

OTHER PUBLICATIONS

Piper, Benjamin, "Sodar Comparison Methods for Compatible Wind Speed Estimation," Acoustic Research Centre, School of Computing, Science and Engineering, University of Salford, Salford, UK.
(Continued)

*Primary Examiner* — Natalie Huls
*Assistant Examiner* — Monica S Young
(74) *Attorney, Agent, or Firm* — Hovey Williams LLP

(57) ABSTRACT

A Sodar apparatus is disclosed for sounding the atmosphere. The apparatus includes a transducer for converting an electrical signal to an acoustic wave and/or vice-versa and transferring means associated with the transducer for transferring the acoustic wave towards the atmosphere and/or for transferring a reflected acoustic wave from the atmosphere. The apparatus further includes isolating means or structure for isolating or attenuating the acoustic wave such that energy of the acoustic wave transferred in a substantially horizontal direction is reduced below energy of the acoustic wave transferred in a substantially vertical direction by a factor of at least 45 dB and more preferably by a factor of at least 70 dB. A method for sounding the atmosphere is also disclosed.

16 Claims, 23 Drawing Sheets

(56) References Cited

U.S. PATENT DOCUMENTS

| | | | |
|---|---|---|---|
| 6,736,238 B2* | 5/2004 | Kerr | F04D 29/663 181/229 |
| 9,309,842 B2* | 4/2016 | Watson | F02M 35/12 |
| 9,534,725 B1* | 1/2017 | Tecson | F16L 55/02718 |
| 2008/0285387 A1* | 11/2008 | Martin | G01S 15/104 367/87 |
| 2010/0046325 A1* | 2/2010 | Martin | G01S 15/104 367/87 |
| 2016/0139001 A1* | 5/2016 | Tran | F01D 15/10 73/116.03 |
| 2018/0071872 A1* | 3/2018 | Parmeshwar | F16L 55/02754 |

FOREIGN PATENT DOCUMENTS

| | | |
|---|---|---|
| EP | 2904422 | 8/2015 |
| JP | H02216487 | 8/1990 |
| JP | H02287114 | 11/1990 |
| JP | H05071781 U | 9/1993 |
| WO | 03019230 | 3/2003 |
| WO | 2004/077094 | 9/2004 |
| WO | 2005015259 | 2/2005 |
| WO | 2006089369 | 8/2006 |
| WO | 2006089371 | 8/2006 |

OTHER PUBLICATIONS

International Search Report and Written Opinion dated Jan. 21, 2016, in PCT/AU2015/000669, filed Nov. 5, 2015.

Piper, Benhamin, "Sodar Comparison Methods for Compatible Wind Speed Estimation," Acoustics Research Centre School of Computing, Science and Engineering, University of Salford, Salford, UK, 2010.

Office Action in corresponding Japanese Application No. 2017-523861, dated May 30, 2019 (English translation attached).

* cited by examiner

APPARATUS FOR SOUNDING THE ATMOSPHERE AND METHOD

CROSS REFERENCE TO RELATED APPLICATIONS

This application is a national stage application under 35 U.S.C. 371 of International Patent Application No. PCT/AU2015/000669, filed Nov. 5, 2015, which claims the priority of Australian Patent Application No. 2014904468, filed Nov. 6, 2014. The present invention is related to the following international patent applications, the disclosures of which are incorporated herein by cross reference.

PCT1—AU01/00247 entitled Acoustic Sounding
PCT2—AU02/01129 entitled Measurement of Air Characteristics in the lower atmosphere
PCT3—AU2004/000242 entitled Improved Sodar Sounding of the lower atmosphere
PCT4—AU2004/001075 entitled Detection of Wake Vortices and the like in the lower atmosphere
PCT5—AU2006/000245 entitled Characterization of Aircraft Wake Vortices
PCT6—AU2006/000247 entitled Staged Sodar Sounding
PCT7—AU2006/000818 entitled Sodar Sounding of the Lower Atmosphere
PCT8—AU2013/001128 entitled Method for Improving Performance of a Sodar System

TECHNICAL FIELD

The present invention relates to apparatus for use in sounding the atmosphere. The apparatus may include sodar apparatus including bistatic chirp sodar apparatus.

It is desirable in such apparatus to maximise signal to noise ratio of acoustic signals received from the atmosphere in a substantially vertical direction. It is also desirable to minimise acoustic signals including acoustic chirp signals being transmitted in horizontal directions, and/or to minimise effect of external noise from the horizontal directions including environmental noise, that may reduce signal to noise ratio in an associated receiver.

BACKGROUND OF INVENTION

Acoustic chirp signals belong to a class of waveforms known as being suitable for use in pulse compression or matched filter receivers. A good introduction to pulse compression waveforms and matched filters is given in "Introduction to radar Systems, Third Edition, by Merril I. Skolnik, McGraw Hill, 2001, ISBN 0-07-118189-X".

A component that significantly affects performance of a sodar apparatus is the antenna system used to transmit and receive the acoustic signals including acoustic chirp signals. The antenna system preferably operates in a bistatic configuration. A bistatic configuration denotes that separate transmitter and receiver antennas are used, to enable an associated receiver to receive at the same time as a transmitter transmits, so that longer transmit pulses can be used. This arrangement may avoid a dead zone that would otherwise be present if a monostatic sodar configuration was used. As the acoustic signals or pulses may typically be greater than 100 ms and usually around 1 second in length, the dead zone in a monostatic system may be about 150 m for a 1 second acoustic transmit pulse, which is undesirable.

The level of transmitted acoustic pulse in a bistatic sodar apparatus may be about 130 dBA while sensitivity level of the associated receiver may be as low as 0 dBA, being limited by atmospheric noise. This level of sensitivity may be achieved by using matched filter processing in the receiver. In a bistatic configuration wherein the transmitter and receiver may operate simultaneously on separate antennas, it is desirable that isolation or attenuation between the transmitter and receiver should be in excess of the difference between the level of transmitted acoustic pulse and the level of sensitivity of the receiver (130 dBa), to avoid interference between the transmitted acoustic signal with signals received from the atmosphere. However, the signals received from the atmosphere at a range of a few 10's of meters may typically be about 30 dBa, so that a direct signal from the transmitter at a range of a typical separation distance between transmitter and receiver antennas (about 4 m) should be about 10 dB below the level of the first received signals to avoid interference with the received signals. This may reduce a requirement for isolation or attenuation to around 110 dB (130 dBa–(30 dBa–10 dB)).

FIG. 1 shows the effect of interference on a received signal from a transmitted signal when there is insufficient isolation between the transmitter and receiver, e.g. when the level of isolation is similar to isolation achieved in current monostatic sodar systems (approximately 50 dB). In FIG. 1 interference from the transmitted signal shows up with pulse length of 0.35 seconds as a brighter section below 60 m in both amplitude and vertical wind speed. This interference compromises the data received from the atmosphere below 60 m. Further in FIG. 1, there are vertical pulses of interference from outside the system that show up in the vertical wind speed around time 20:15 between a height of 200 m and 400 m. The signal to noise ratio is only around 10 dB up to 100 m as shown in the shaded bar on the right in FIG. 1. This occurs because the receiver is compromised by direct signals from the transmitter. Moreover the receiver may also pick up strong local noise sources, further compromising receiver sensitivity and signal to noise ratio.

As noted above, isolation or attenuation between the transmitter and receiver should be greater than about 110 dB, being the difference between the level of transmitted acoustic pulse signal and the level of first signals received at the receiver with a margin of 10 dB. As the distance between the transmitter and receiver antennas may be about 4 m in a typical installation, this level of isolation needs to be achieved over a relatively small distance. Another aspect of the isolation required is that it should be applied in a substantially horizontal direction, while isolation or attenuation in a vertical direction, ie. towards the atmosphere, should be substantially 0 dB, to avoid attenuating signals being transmitted or received in a vertical direction.

In a paper "Bradley, S. G., "Use of Coded Waveforms for Sodar Systems" Meterol. Almos. Phys. 71, 15-23 (1999)", Bradley stated that a "For a sodar the use of a longer pulse is generally precluded because the first range gate would be too distant". This assumes that the receiver can only be turned on after the transmitted pulse is complete as would be the case for a monostatic system, otherwise the receiver may be overloaded and may suffer interference from a direct transmitted signal. However if a bistatic system is used, the limitation of having a too distant first range gate may be substantially overcome if horizontal isolation between the transmitter and receiver antennas could be increased to a level where the transmitted signal has substantially little or no influence on the receiver, eg., greater than about 110 dB for a bistatic sodar system.

The present invention may provide an improved apparatus for sounding the atmosphere and a method for sounding the atmosphere using the improved apparatus. The apparatus may be arranged such that any acoustic signal that is passed directly from a transmitter to an associated receiver is adequately isolated and/or attenuated.

A reference herein to a patent document or other matter which is given as prior art is not to be taken as an admission that that document or matter was known or that the information it contains was part of the common general knowledge in Australia or elsewhere as at the priority date of any of the disclosure or claims herein. Such discussion of prior art in this specification is included to explain the context of the present invention in terms of the inventor's knowledge and experience.

Throughout the description and claims of this specification the words "comprise" or "include" and variations of those words, such as "comprises", "includes" and "comprising" or "including, are not intended to exclude other additives, components, integers or steps.

SUMMARY OF INVENTION

According to one aspect of the present invention there is provided apparatus suitable for sounding the atmosphere, said apparatus comprising:

a transducer for converting an electrical signal to an acoustic wave and/or vice-versa;

transferring means or structure associated with said transducer for transferring the acoustic wave towards the atmosphere and/or for transferring a reflected acoustic wave from said atmosphere; and acoustic isolating means or structure for isolating or attenuating the acoustic wave such that energy of said acoustic wave transferred in a substantially horizontal direction is reduced below energy of said acoustic wave transferred in a substantially vertical direction by a factor of at least 45 dB, preferably by a factor of at least 60 dB and more preferably by a factor of at least 70 dB.

The isolating means may include an acoustic baffle system such as a bank of baffles for attenuating energy of the acoustic wave transferred in a substantially horizontal direction. The bank of baffles may include at least two baffle stages including an inner baffle stage and an outer baffle stage. The bank of baffles may additionally include an intermediate baffle stage between the inner and outer baffle stages. The bank of baffles may be substantially circular in horizontal cross section.

The inner baffle stage may include at least a sound absorbing layer and a sound attenuating layer. The outer baffle stage may include at least a sound absorbing layer. The outer baffle stage may include a sound attenuating layer.

The bank of baffles may include at least one diffraction edge for providing attenuation in a substantially horizontal direction. The bank of baffles may include a first diffraction edge for providing first attenuation in a substantially horizontal direction and a second diffraction edge for providing second attenuation in a substantially horizontal direction. The first attenuation may be at least 30 dB in a substantially horizontal direction and the second attenuation may be at least 15 dB in a substantially horizontal direction.

The acoustic baffle system may include a sound containment region for providing third attenuation in a substantially horizontal direction. The sound containment region may be located intermediate the first and second diffraction edges. The third attenuation may be at least 33 dB in a substantially horizontal direction.

The transferring means may include a parabolic reflector. The transducer may be offset relative to a major surface of the parabolic reflector to minimise obstruction or blockage of energy transferred to and/or from the parabolic reflector.

The isolating means may be adapted to attenuate acoustic energy transferred directly when the apparatus is acting as a transmitter, to a like apparatus acting as a receiver, to minimise interference and the like in the receiver. Preferably the attenuation of the energy transferred directly between the transmitter and receiver is at least 85 dB. The isolating means may be adapted to minimise effects of external acoustic noise on the receiver.

The electrical signal preferably includes a chirp pulse. The chirp pulse may include a coded pulse having a pulse compression waveform.

According to a further aspect of the present invention there is provided a method for sounding the atmosphere comprising: generating an acoustic wave; transferring the acoustic wave towards the atmosphere; receiving a reflected acoustic wave from said atmosphere, and isolating or attenuating energy of said acoustic wave transferred in a substantially horizontal direction such that said energy transferred in said substantially horizontal direction is reduced below energy of said acoustic wave transferred in a substantially vertical direction by a factor of at least 55 dB, preferably by a factor of at least 60 dB and more preferably by a factor of at least 70 dB.

BRIEF DESCRIPTION OF DRAWINGS

Preferred embodiments of the present invention will now be described with reference to the accompanying drawings wherein.

DETAILED DESCRIPTION

An antenna system for a sodar based wind profiler may include a transmitter antenna to transmit acoustic signals into the atmosphere from which they may be reflected back into a receiver antenna. As the antennas may be used over a range of frequencies, point sources are preferably used for transducers of the antennas as they may be substantially frequency independent over a range of frequencies (e.g. 1.3 KHz to 3.3 KHz) used to transmit or receive acoustic signals. To steer in different directions, separate single point transducers may be used for each direction. Because a point source radiates spherical waves, this may be converted or transferred into plane waves by any suitable means such as a parabolic reflector as shown in FIG. 2.

Figure 2:
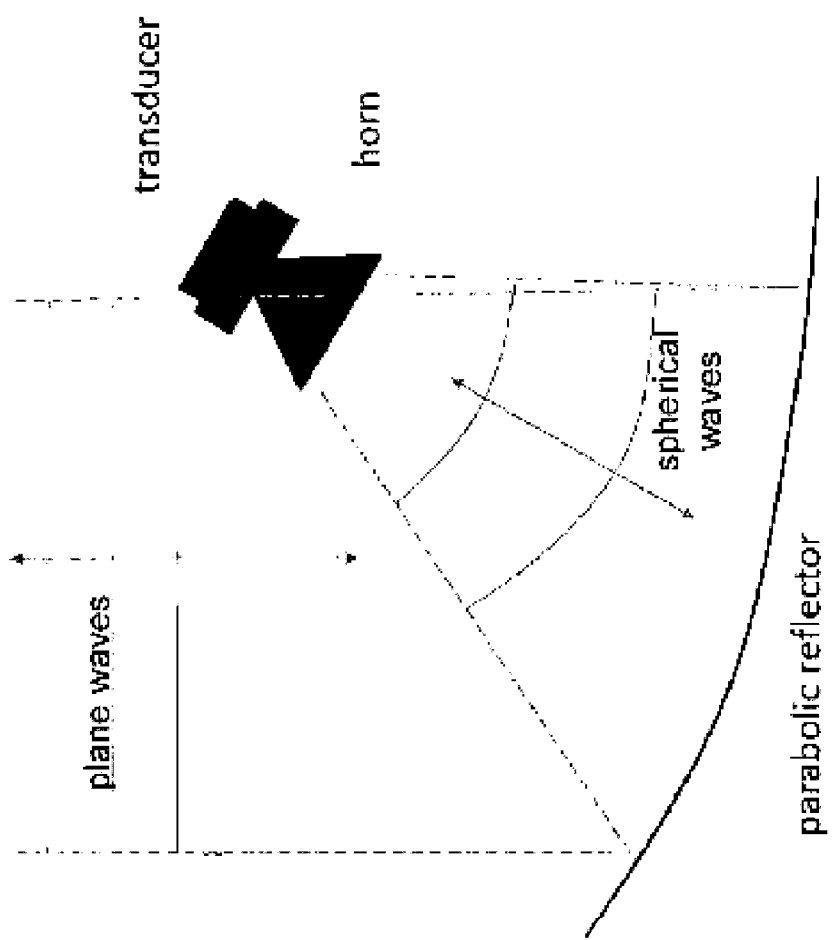
FIG. 2 shows a known antenna system associated with a monostatic sodar.

FIG. 2 shows a known antenna system that may be adapted for use in a wind profiler. The antenna system may include several components each of which may have a critical influence on operation of the wind profiler. If any component is missing or has poor performance then the performance of the wind profiler as a whole may be compromised.

Figure 3:
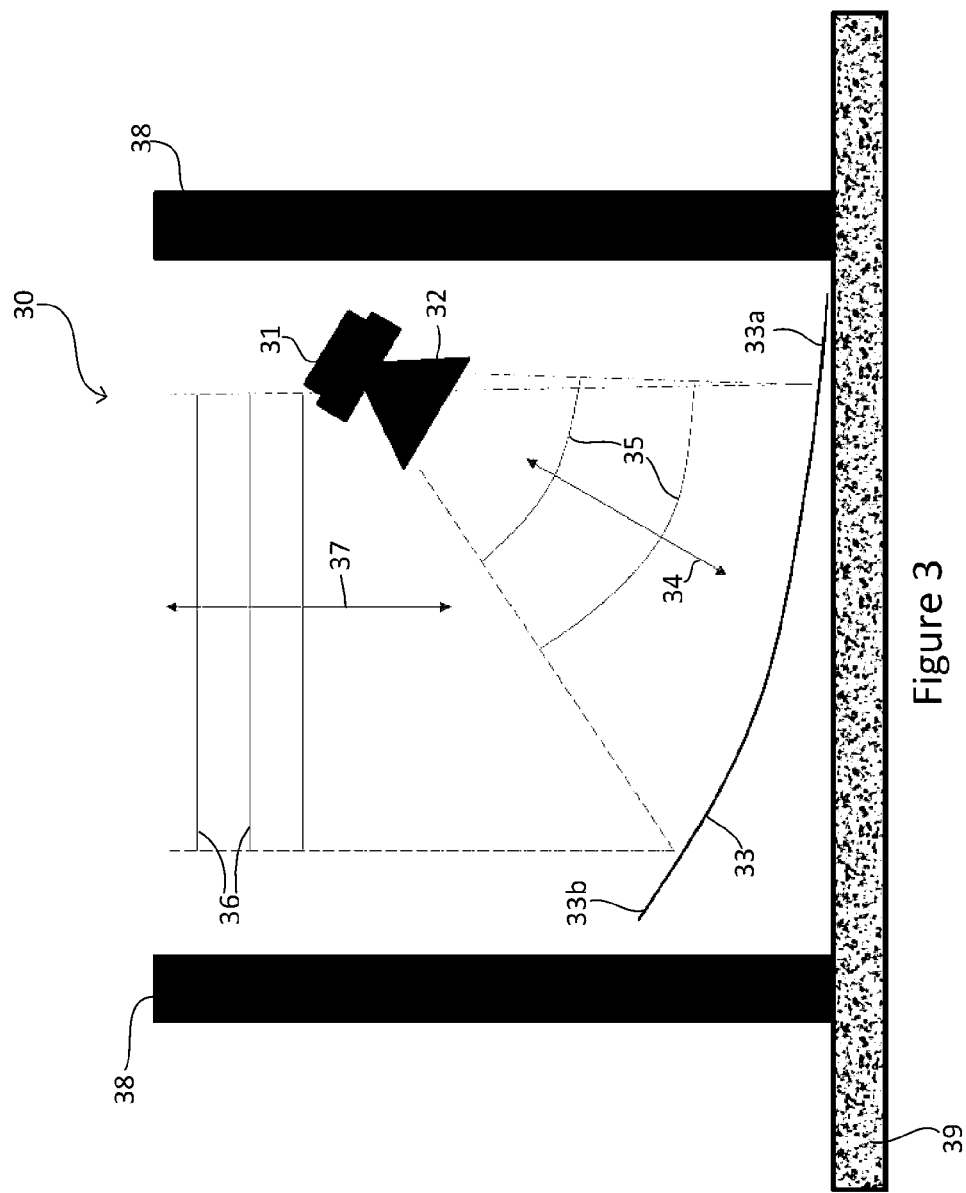
FIG. 3 shows an antenna system for a bistatic sodar based wind profiler with baffles.

Referring to FIG. 3 an antenna system 30 for a sodar based wind profiler includes the following components for either a transmitter antenna or for a receiver antenna which may operate together to provide a functional wind profiler.

The antenna system includes a single point transducer 31 adapted to convert electrical energy to acoustic energy in the case of a transmitter antenna and to convert acoustic energy to electrical energy in the case of a receiver antenna. Transducer 31 may have a substantially spherical beam width of 180 degrees.

The antenna system 30 includes a horn 32 on transducer 31 adapted to generate a spherical beam of acoustic energy at a correct beam width to be directed onto parabolic reflector 33 in the case of a transmitter antenna, or to receive a spherical beam of acoustic signals from parabolic reflector 33 in the case of a receiver antenna. Horn 32 may be used to convert a 180 degree spherical beam generated by transducer 31 into a spherical beam 34 having an approximately 40 degrees beam width for illuminating parabolic reflector 33.

Parabolic reflector 33 is adapted to convert spherical waves 35 generated by horn 32 into plane waves 36 having a relatively narrow beam width in the case of a transmitter antenna and/or to convert plane waves of received signals into spherical waves in the case of a receiver antenna. Parabolic reflector 33 may be arranged such that transducer 31 is offset relative to a major surface of parabolic reflector 33 so that transducer 31 substantially does not block or obstruct plane waves 36. Furthermore, the width of beam 34 may be arranged so that edges 33a, 33b of parabolic reflector 33 are illuminated at a much lower level than the middle of reflector 33. This arrangement of transducer 31, horn 32 and reflector 33 may ensure that beam 37 from reflector 33 is relatively clean and smooth having a minimum of side lobes that might otherwise degrade performance of the antenna system.

Parabolic reflector 33 is preferably made of an acoustically non-resonant material so that in the event of rain falling on reflector 33, it may not generate excess acoustic noise that may degrade performance of the associated receiver. Typically parabolic reflector 33 may be substantially circular and substantially 1.2 m in diameter.

The antenna system 30 includes an acoustic baffle(s) 38 placed around components 31 to 33 to isolate and/or shape beam 37 to and from parabolic reflector 33 and/or to control noise and/or interference. Transducer 31 and reflector 33 for both transmitter and receiver antennas may be placed inside acoustic baffle(s) 38 as shown in FIG. 3 to achieve acceptable performance of a sodar based wind profiler. Acoustic baffle(s) 38 may be placed on the ground or on a concrete pad 39 or other similar mounting surface that does not transmit sound. In one form the height and spacing between acoustic baffle(s) 38 may be approximately 1.4 times the diameter of parabolic reflector 33 to ensure that beam 37 from and/or to parabolic reflector 33 is not obstructed at its edges and/or to avoid compromising side lobe performance of antenna system 30. In some embodiments antenna system 30 may be placed below ground level by excavation so that the top(s) of acoustic baffle(s) 38 is/are substantially level with ground level.

The overall shape and arrangement of baffle(s) 38 relative to parabolic reflector 33 may be circular, square, hexagonal or octagonal in horizontal cross-section and/or may be arranged in any other convenient manner consistent with the above objects. Substantial symmetry between parabolic reflector 33 and the shape/arrangement of baffle(s) 38 may serve to enhance performance of the antenna system. For example, when parabolic reflector 33 is substantially circular the shape/arrangement of baffle(s) 38 may also be substantially circular in horizontal cross-section. In one form, baffle(s) 38 may comprise a circular tube surrounding parabolic reflector 33 or a plurality of nested circular tubes. The or each tube may extend substantially vertically or may be flared away from parabolic reflector 33 in a shape of a funnel. The or each circular tube may be arranged to be substantially concentric with parabolic reflector 33.

In one form the circular tube may be formed from a concrete pipe (e.g. 50 mm thick). The height and diameter of the concrete pipe may be 1.4 times the diameter of the associated parabolic reflector 33. The pipe may be lined with 25 mm of a sound absorbing medium such as www.autex-.com.au/acoustics/quietspace-panel/. Non circular shapes such as square may be used for the or each acoustic baffle. However if the shapes are not the same or similar shape as the antenna footprint there may be less attenuation and sound containment because symmetry with the (round) antenna would not be preserved. In circumstances where a substantial mismatch exists between the footprint of the parabolic reflector (e.g. round) and the shape of the acoustic baffles (e.g. square), provision of additional diffraction edges and sound absorbing regions may be needed to further enhance performance of such mismatched baffles.

As noted above the efficiency of transducer 31 may be an important factor in obtaining good overall signal to noise ratio from the associated receiver. A typical high efficiency transducer may have a sound pressure level at 4 kHz of 117 dBa for a 1 watt input measured at 1 m from the transducer. There are many transducers that form point sources but have much lower efficiency, with typical values ranging from 98 dBa to 110 dBa for 1 watt @ 1 m. These lower efficiency transducers may have lower transmit power for similar input power compared to the device mentioned above. As the same type of transducer 31 may be used for both the transmitter and receiver antenna, a transducer with 7 dB reduced efficiency may translate to a 14 dB overall loss of signal returned from the atmosphere.

Figure 1:
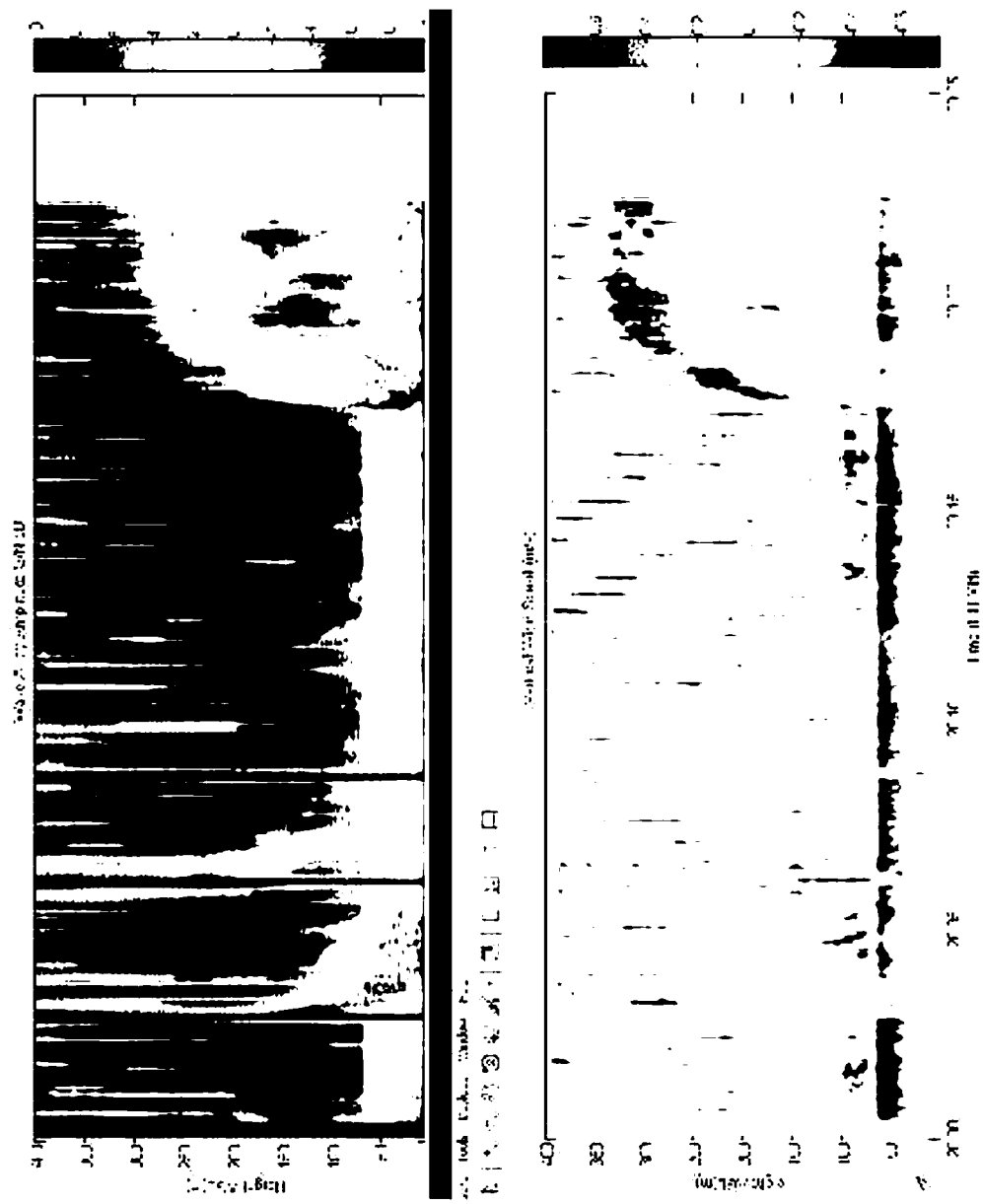
FIG. 1 shows signals received from a bistatic acoustic sodar apparatus when there is insufficient attenuation of a direct signal from the transmitter and external noise is being received.

Attenuation performance of baffle(s) 38 in a horizontal direction may be an important factor to ensure that a transmitted signal does not interfere with a received signal and/or to ensure that substantially little or no noise from external sources can enter the associated receiver from a horizontal direction. A bistatic sodar system was initially trialled with baffle(s) 38 that are similar to baffles widely used in monostatic sodar systems. The known baffles had about 45 dB of attenuation, similar to the amount of attenuation used in a monostatic sodar system. However this amount of attenuation was not sufficient to prevent a transmitted acoustic signal interfering with the signal received back from the atmosphere (refer FIG. 1). Moreover the associated receiver was subjected to excessive noise originating from sources in a horizontal direction.

A bank or series of nested baffles was subsequently trialled including first and second baffle stages with the second baffle stage being separated from the first baffle stage by a 50 mm air gap. A single diffraction top edge was also added to the first baffle stage. This arrangement produced about 60 dB of attenuation but still was not sufficient to avoid compromising performance of the bistatic sodar system.

Figure 4:
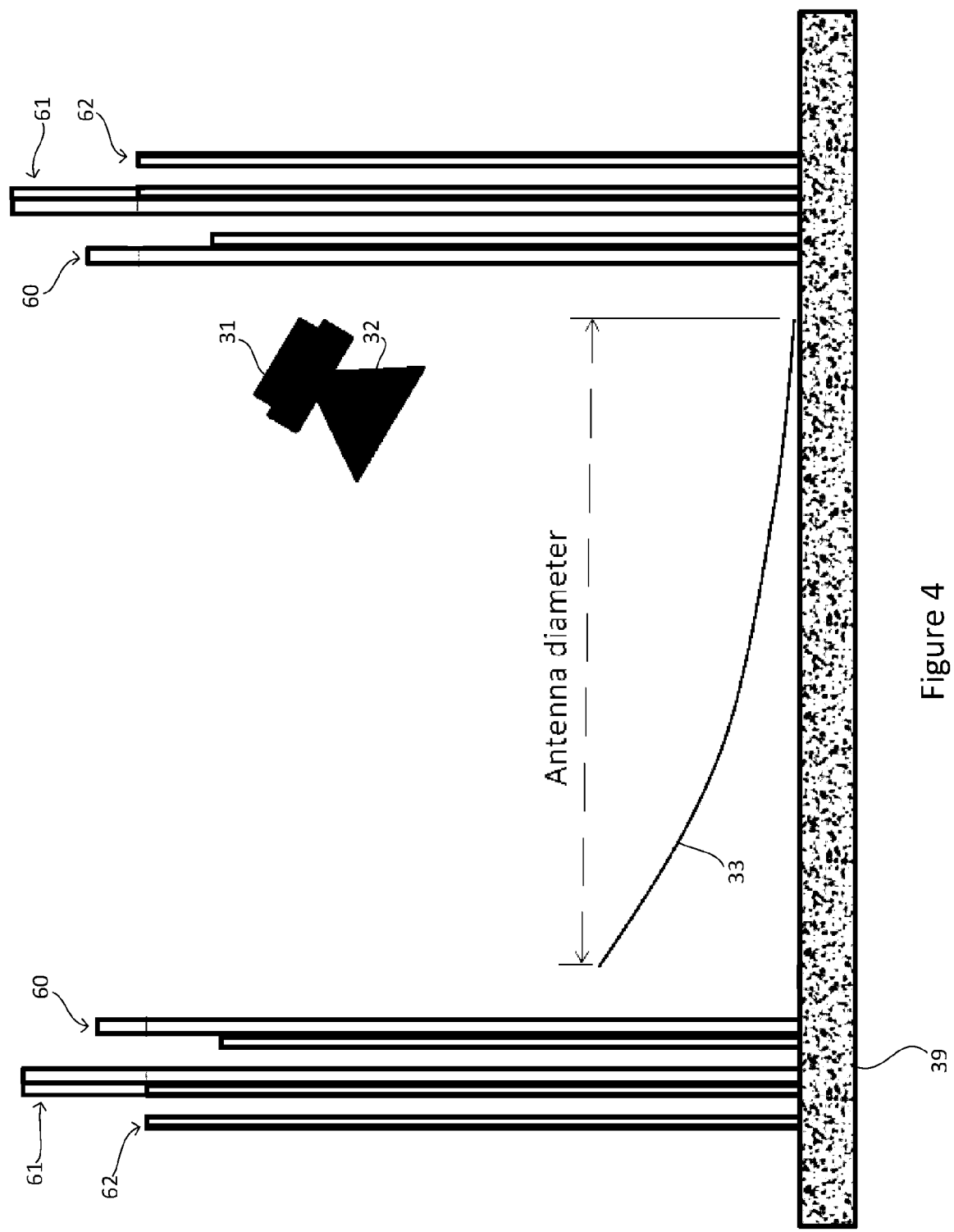
FIG. 4 shows an antenna system for a bistatic sodar based wind profiler including a bank of baffles according to one embodiment of the present invention.
Figure 5:
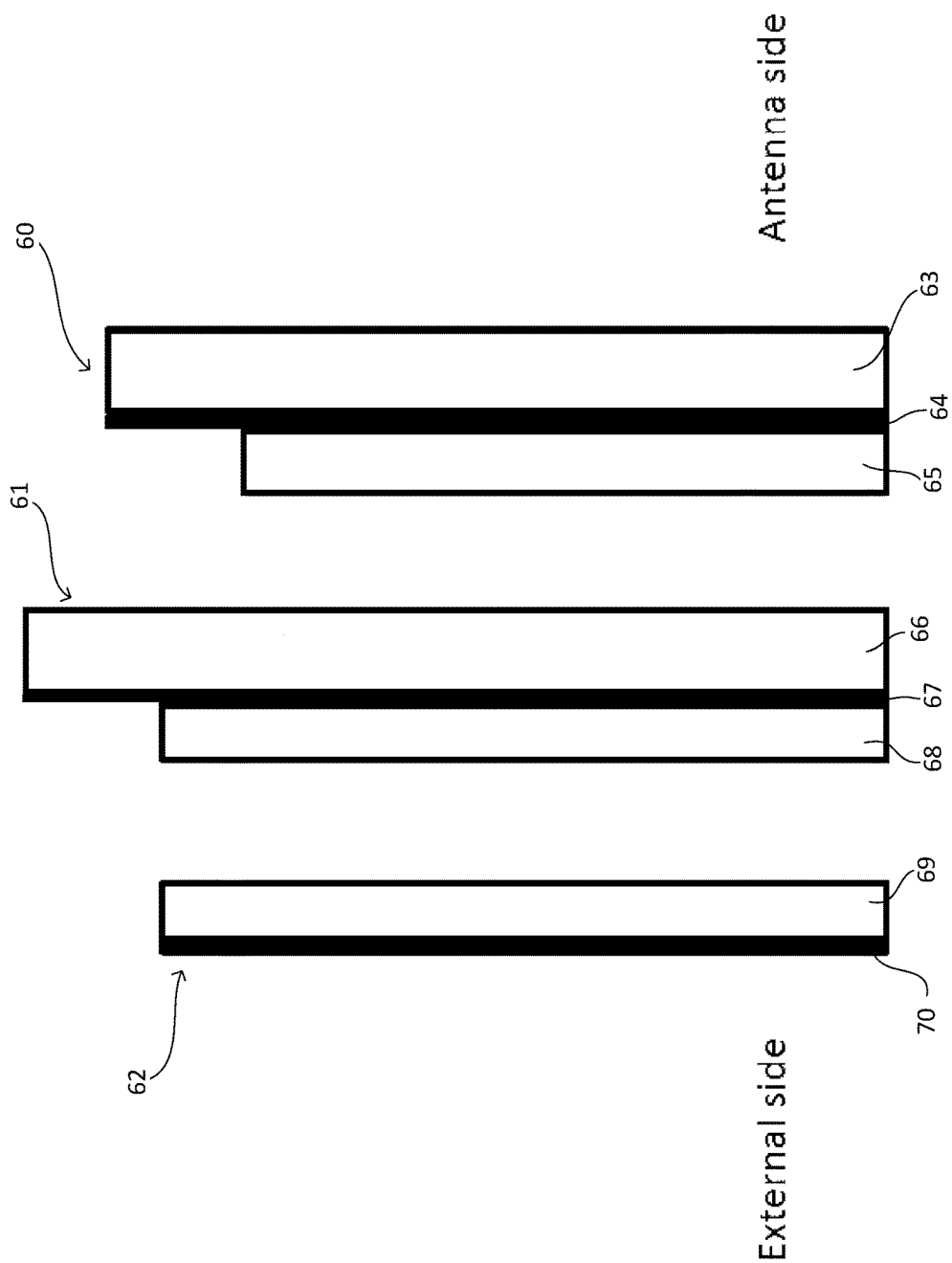
FIG. 5 shows a detailed view (in vertical cross-section) of the bank of baffles in FIG. 4.

A bank of nested substantially vertically extending baffles was then trialled including three baffle stages as shown in FIGS. 4-5. The three baffle stages include an inner substantially vertically extending baffle stage 60, an intermediate substantially vertically extending baffle stage 61 and an outer substantially vertically extending baffle stage 62 separated by respective air gaps. The or each air gap may be substantially a half wavelength at the operating frequency of the wind profiler.

Referring to FIG. 5, inner baffle stage 60 includes a sound absorbing layer 63, a sound attenuating layer 64 and a substrate layer 65. Sound absorbing layer 63 may comprise sound absorbing board such as http://autex.com.au/products/Interior-Acoustics/Quietspace/Panel. In one form sound absorbing layer 63 may be approximately a quarter wavelength thick at the operating frequency. Sound attenuating layer 64 may comprise high density plastics such as high density polyethylene (HDPE). In one form sound attenuating layer 64 may be approximately 5 mm thick.

Substrate layer 65 may provide a support structure for layers 63, 64. Substrate layer 65 may include low density material such as 25 mm×25 mm wooden uprights. In one form substrate layer 65 may be approximately 25 mm thick.

The overall height of the sound absorbing layer 63 and the sound attenuating layer 64 may be substantially 1.3 times the diameter of the associated parabolic reflector 33. Sound absorbing layer 63 and sound attenuating layer 64 may be higher than substrate layer 65. In one form the height of sound absorbing layer 63 may be approximately the same as the height of attenuating layer 64 or may be approximately 1.3 times the diameter of associated parabolic reflector 33 to avoid cutting off edges of the antenna beam.

Intermediate baffle stage 61 includes a sound absorbing layer 66, a sound attenuating layer 67 and a substrate layer 68. Sound absorbing layer 66 may comprise sound absorbing board such as http://autex.com.au/products/Interior-Acoustics/Quietspace/Panel. In one form sound absorbing layer 66 may be approximately one wavelength thick at the operating frequency. Sound attenuating layer 67 may comprise high density plastics such as high density polyethylene (HDPE). In one form sound attenuating layer 67 may be approximately 5 mm thick.

Substrate layer 68 may provide a support structure for layers 66, 67. Substrate layer 68 may include low density material such as 25 mm×25 mm wooden uprights. In one form substrate layer 68 may be approximately 25 mm thick.

The height of sound attenuating layer 67 may be substantially 1.4 times the diameter of the associated parabolic reflector 33. Sound absorbing layer 66 may be the same height as sound attenuating layer 67. In one form the height of sound absorbing layer 66 may be approximately one wavelength higher at the operating frequency than the height of absorbing layer 63 or may be approximately 1.4 times the diameter of the associated parabolic reflector 33.

Outer baffle stage 62 includes a substrate layer 69 and a sound attenuating layer 70. Substrate layer 69 may provide a support structure for layer 70. Substrate layer 69 may include low density material such as 25 mm×25 mm wooden uprights. In one form substrate layer 69 may be approximately 25 mm thick. Sound attenuating layer 70 may comprise high density plastics such as high density polyethylene (HDPE). In one form sound attenuating layer 70 may be approximately 5 mm thick. The height of sound attenuating layer 70 may be approximately 1.2 times the diameter of the associated parabolic reflector 33.

Performance of the above bank of baffles when surrounding a transmitter antenna may provide up to 75 dB of attenuation when the transmitted signal is measured at 5 m from the bank of baffles. This may provide sufficient attenuation of a direct transmitted signal to ensure that performance of the associated receiver is not compromised. There may be further attenuation of the directly transmitted signal by a similar bank of baffles surrounding the receiver to provide substantially 110 dB total attenuation between the transmitter and receiver. Note that total attenuation may not be a simple sum of the attenuation of the two banks of baffles. Further, the receiver may not suffer degradation from horizontally propagated noise that is less than 80 dBa.

Figure 6:
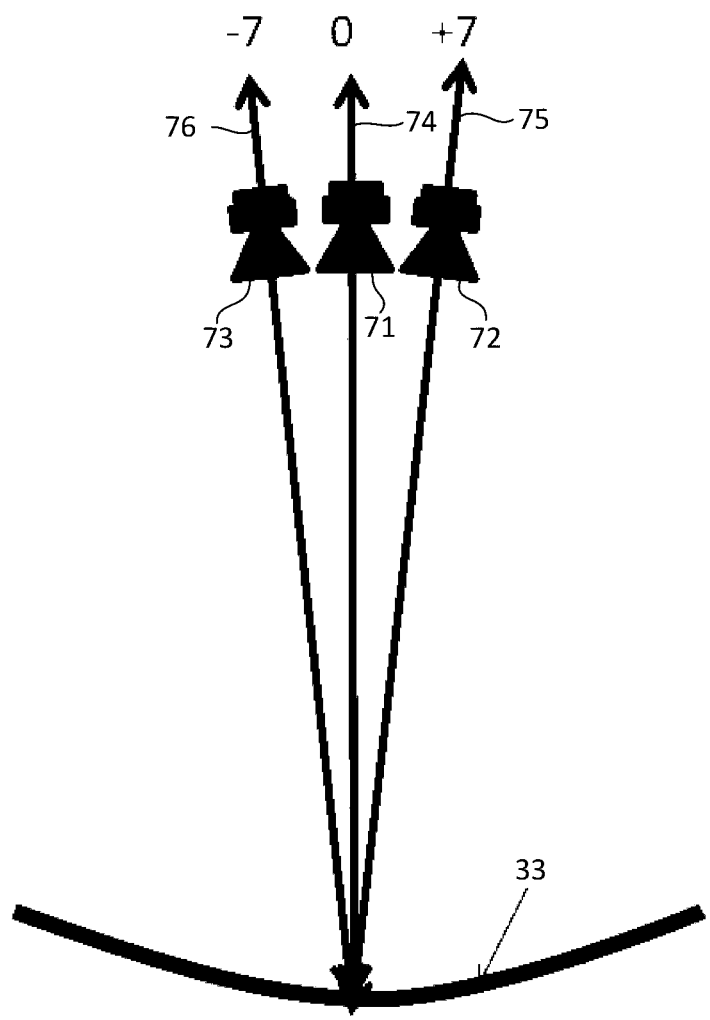
FIG. 6 shows a sodar antenna arrangement with three offset beams.

In order to optimise use of an antenna in a sodar system, three feed horns 71, 72, 73 as shown in FIG. 6 may be used to transmit or receive signals giving rise to an antenna radiation pattern including three beams. The three beams may include a first or main lobe 74 oriented substantially vertically, a second lobe 75 offset at +7 degrees from the vertical, and a third lobe 76 offset at −7 degrees from the vertical as shown in FIG. 6. The three beams or lobes may be oriented to obtain information from the North and South or East and West or any other suitable orientation.

Figure 7:
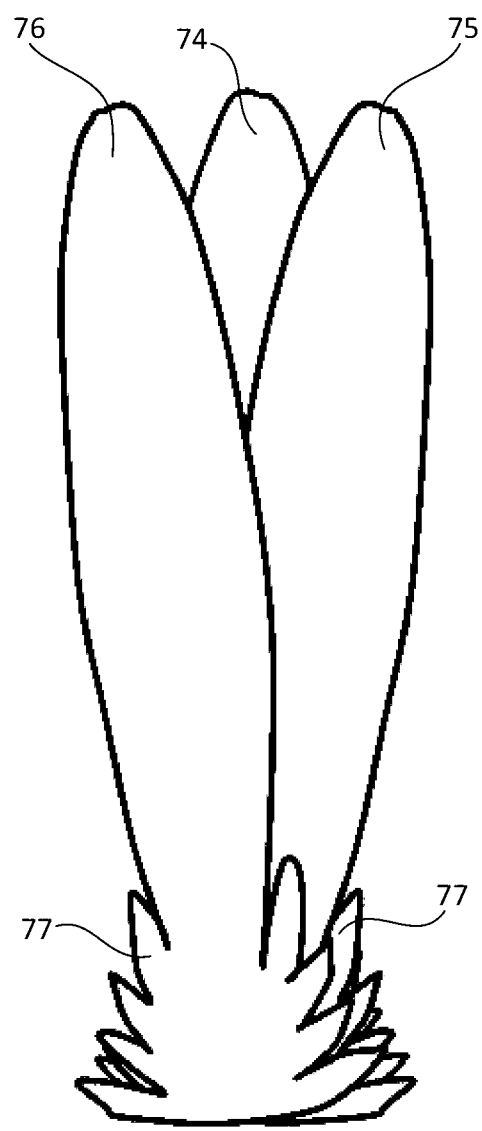
FIG. 7 shows a sodar antenna with offset beam patterns without baffles.

The first, second and third lobes 74 to 76 have associated side lobes 77 in the far field as shown in FIG. 7. However side lobes 77 are not desirable since they may reduce performance of the sodar system by emitting signals at angles other than the main beam, and likewise by receiving unwanted signals from angles other than the main beam. To minimise effects of the unwanted side lobes 77 an isolating structure such as an acoustic baffle as described below may be placed around the transmitter and receiver antennas associated with the sodar system.

Because in a bi-static sodar system the transmitter and receiver operate simultaneously, there should be effective isolation of the signals that may pass directly from the transmitter to the receiver to avoid interference in the receiver from the transmitter.

There are three main signals that may pass from the transmitter to the receiver, including a) electrical signals that may couple between cables of the sodar system (at about 1 m distance), b) direct acoustic signals that may pass from the transmitter to the receiver through the transmitter and receiver baffles (the transmitter and receiver may be 4 m apart), and c) acoustic signals that may pass from the transmitter to the receiver as a result of diffraction that takes place over the top of the acoustic baffles.

Unwanted acoustic signals that may pass from the transmitter to the receiver may be isolated or attenuated via acoustic baffles. The acoustic baffles may be placed around the transmitter and receiver antennas to obtain desirable isolation or attenuation between transmitter and receiver. Total isolation or attenuation between transmitter and receiver may be given by: Total isolation=Acoustic transmitter level−Minimum receiver level+Margin.

Diffraction across the top of the bank of baffles may significantly reduce performance of the bank of baffles. Experiments suggest that performance of the bank of baffles may be significantly enhanced by controlling the effect of diffraction over the top edge(s) of the bank of baffles.

Figure 8:
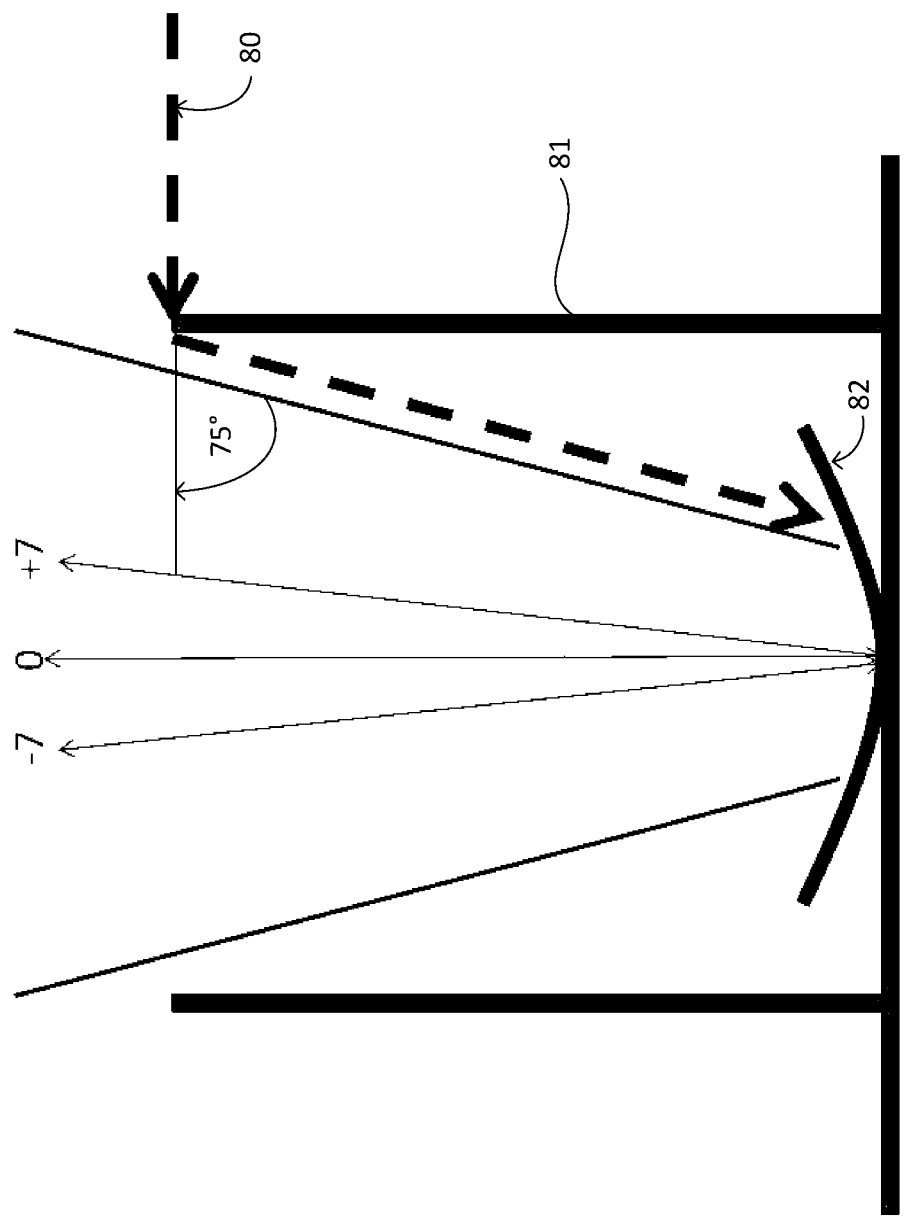
FIG. 8 shows a sound path for diffraction over a single edge of a baffle.

FIG. 8 shows a typical sound path 80 due to diffraction over a top edge of a single baffle 81 associated with a receiver antenna 82. Sound path 80 undergoes 75 degrees diffraction relative to a horizontal path.

Figure 9A:
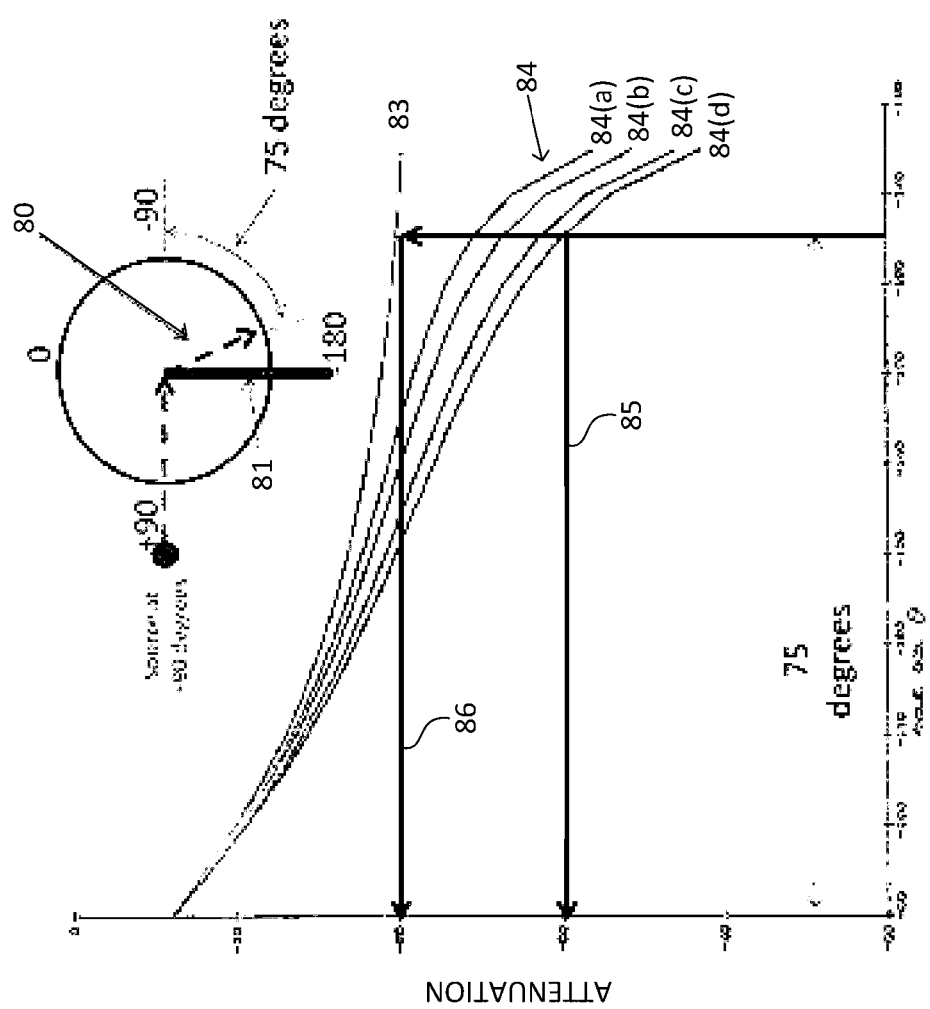
FIG. 9A shows 30 dB attenuation due to diffraction for an angle of 75 degrees.
Figure 9B:
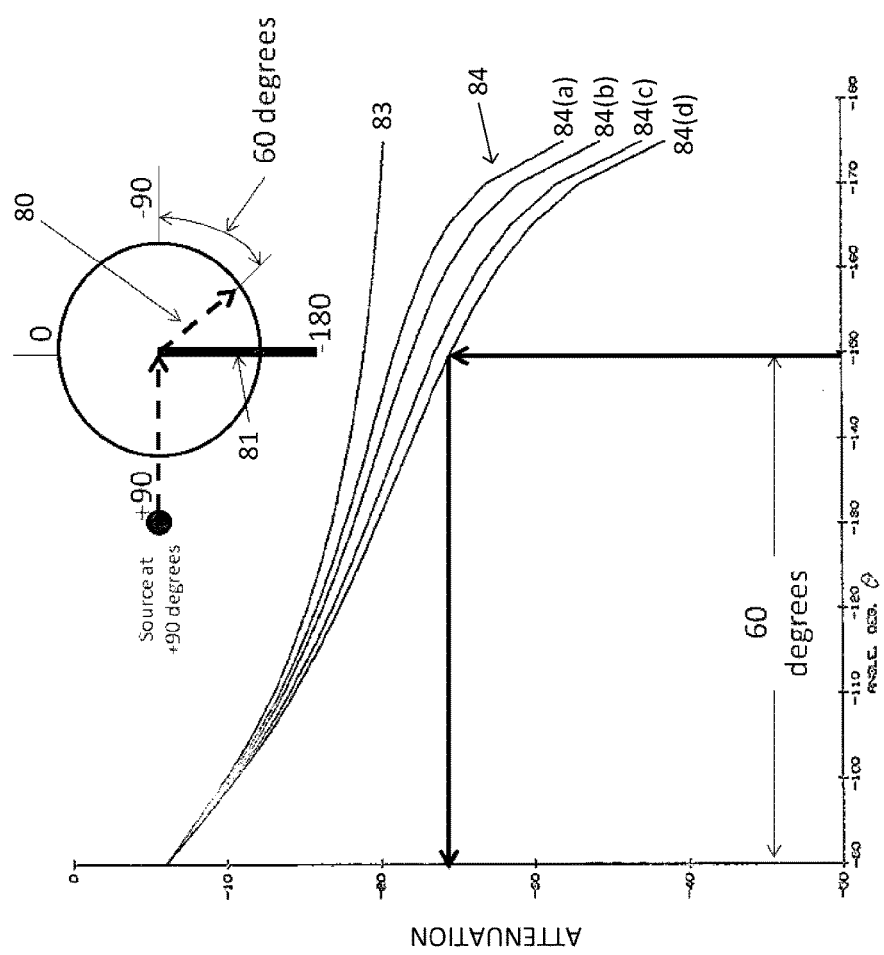
FIG. 9B shows 24 dB attenuation for an angle of 60 degrees.
Figure 9C:
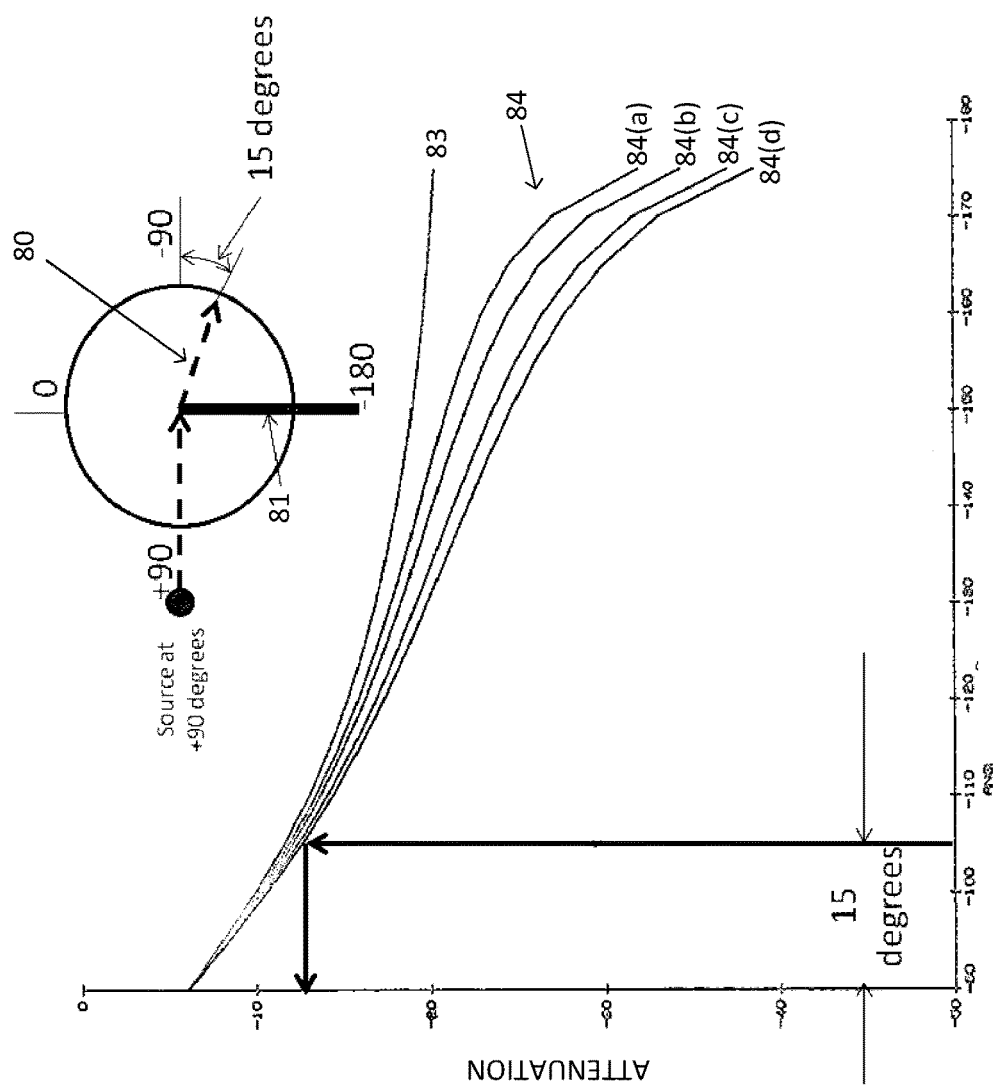
FIG. 9C shows 12 dB attenuation for an angle of 15 degrees.

FIGS. 9A to 9C show attenuation profiles 83, 84 for sound path 80 plotted against angles of diffraction over a single hard baffle edge (83) and absorbing baffle edges (84a-84d) associated with baffle 81. The absorbing edges give rise to attenuation profiles 84a-84d respectively depending upon the coefficient of absorption of the absorbing material used on the top edge of baffle 81. A baffle edge may have a coefficient of absorption with real and imaginary parts (refer http://bura.brunel.ac.uk/bitstream/2438/3858/1/Fulltext-.pdf). FIG. 9A shows 30 dB attenuation (85) due to diffraction loss for a 75 degree angle for an absorbing top edge associated with baffle 81 and 20 dB attenuation (86) for a hard edge. The baffle edge being considered has absorbing material assumed to have a real part of 1 and an imaginary part of 0 (1+j0).

Acoustic baffles may be adapted to provide isolation or attenuation of direct sound waves passing through the (or each) baffle and attenuation or absorption of direct sound waves diffracted over the top of the (or each) baffle. The diffracted signal passing over the top of the (or each) baffle may be the more difficult to contain.

Assuming that the acoustic baffles include a single baffle stage, attenuation at the top of the single baffle may be related to the angle of the diffracted signal. The level of signal diffracted over the top of the single baffle may be calculated from:

Attenuated signal level due to diffraction loss=acoustic transmitter level−antenna baffle attenuation, wherein attenuation for a single baffle=diffraction loss+antenna side lobe.

For baffle geometry as described herein the portion of the beam that is subjected to diffraction is located at an angle of 15 degrees away from the centre of the antenna beam. In the near field of the antenna the side lobe at this angle is attenuated 5 dB relative to the transmitter level.

Signal attenuation due to diffraction loss for a single absorbing edge=edge attenuation+antenna side lobe attenuation. Thus signal attenuation due to diffraction loss for a single absorbing edge=30 dB+5 dB=35 dB. Signal attenuation due to diffraction loss for a single hard edge=20 dB+5 dB=25 dB.

The level of acoustic signal in a horizontal direction=transmitter level−signal attenuation due to diffraction loss. Thus for a transmitter level of 130 dBa, the signal level in a horizontal direction for a single absorbing edge=130 dBa−35 dB=95 dBa. The signal level in a horizontal direction for a single hard edge=130 dBa−25 dB=105 dBa.

Figure 10:
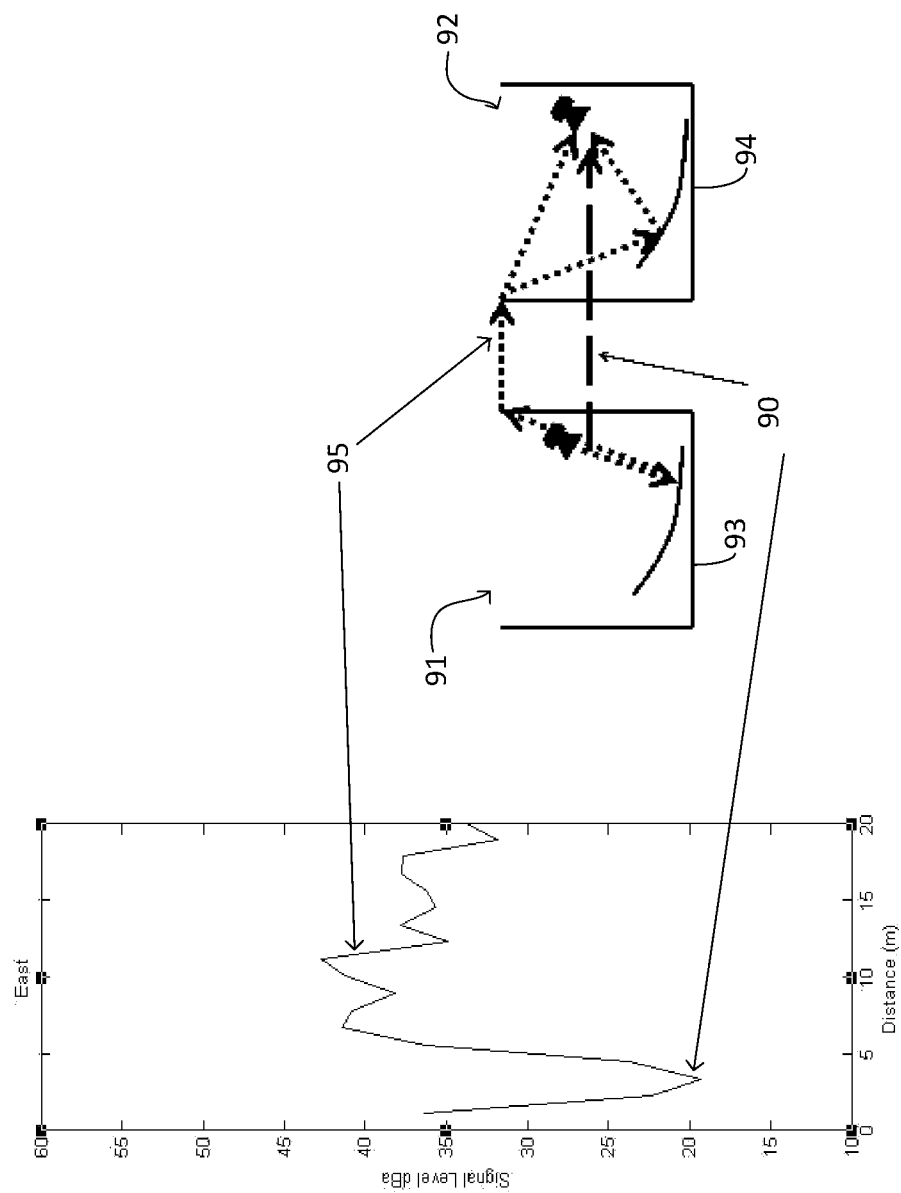
FIG. 10 shows a level of direct signals received from the transmitter at various distances due to diffracted acoustic waves.

FIG. 10 shows a level of acoustic signal from transmitter 91 received at receiver 92 due to diffracted acoustic waves plotted against various distances. At distances of 6 to 10 m the received signal is at a level of 42 dBa. At a distance of 4 m the acoustic signal 90 passes through transmitter and receiver baffles 93, 94 at a level of 20 dBa. The electrically coupled signal at 1 m is at a level of 36 dBa. Signals beyond 12 m are backscattered signals from the atmosphere. Multiple diffracted signal paths 95 are evident at distances of 6 to 12 meters.

For a transmitter level of 130 dBa, and a minimum direct received signal of 42 dBa, total isolation may be calculated as =130 dB−42 dB=88 dB. Thus 88 dB is the total isolation obtained when there is no perceptible interference in the receiver from the transmitter. Receiver interference may manifest as horizontal lines on the amplitude of the received signal and un-expected wind speed and direction errors when total isolation is less than 50 dB. For a 1 second transmitted pulse this may manifest as horizontal lines on the amplitude of the received signal and/or unexpected wind speed and direction errors up to 172 m (error distance=speed of sound/(1×2)=172 m).

Current monostatic sodar systems that use short single frequency pulses do not use high performance baffles. Indeed manufacturers of such systems have not seen any need to do so since in a monostatic system using short pulses of around 100 ms, the receiver is turned off and the first range gate is at around 40 m. This limitation is not viewed as being too detrimental. However, baffles may be used on a monostatic sodar system to limit acoustic noise from the system or to limit noise that may enter the receiver from external sources. Although some manufacturers do not see a need for baffles on monostatic sodar systems as they do not see a need to improve signal to noise ratio performance, the baffles described herein may also be employed on monostatic sodar systems to improve their performance.

Figure 11:
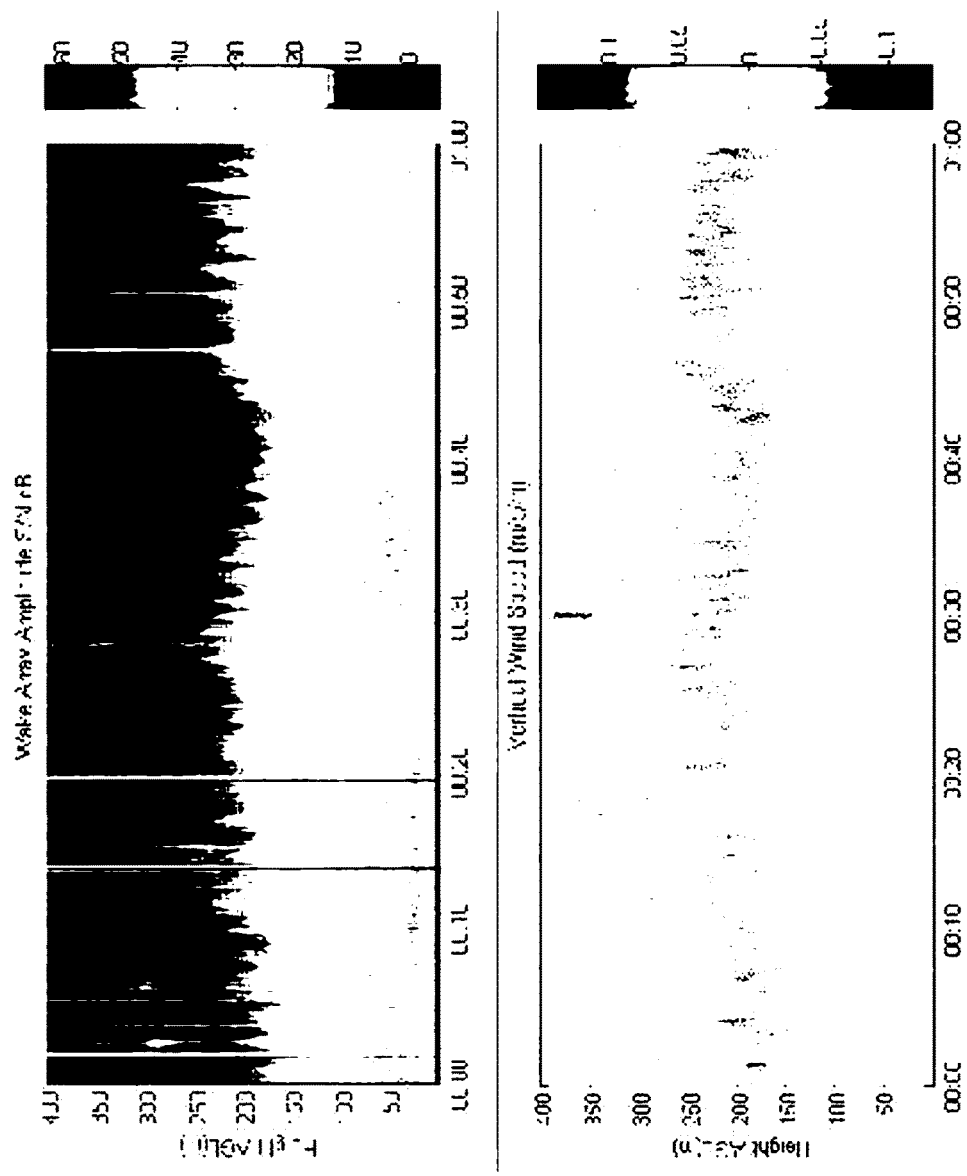
FIG. 11 shows signals received from a bistatic acoustic sodar apparatus when there is sufficient attenuation of a direct signal from the transmitter and external noise is minimised.

FIG. 11 shows an example of the improvement in received signals obtained when additional isolation is placed between the transmitter and receiver. The additional isolation with two relatively high performance baffles may provide total attenuation in excess of 85 dB, or at least 30 dB greater than in the case of FIG. 1. There is still a trace of interference due to the transmitted signal in the received vertical wind speed below 60 m indicating that more attenuation may be useful. This may be achieved by adding (to square or non-circular baffles) a third baffle stage and diffraction edge as described below with reference to FIGS. 12 and 13. The additional attenuation placed around the receiver has also eliminated the pulse interference that was evident in FIG. 1. This indicates that an improvement of horizontal attenuation has been effective in reducing sources of interference such as the directly transmitted signal and noise that might otherwise significantly compromise performance of the bistatic acoustic sodar based wind profiler. Experiments suggest that round baffles with two diffraction edges separated via a sound containment region as described below may provide similar performance to square baffles with three diffraction edges.

With improved attenuation between the transmitter and receiver and improved attenuation of external noise, signal to noise ratio up to 100 m may be greatly improved by at least 30 dB to around 40 dB as shown in the shaded bar on the right of FIG. 11.

Figure 12:
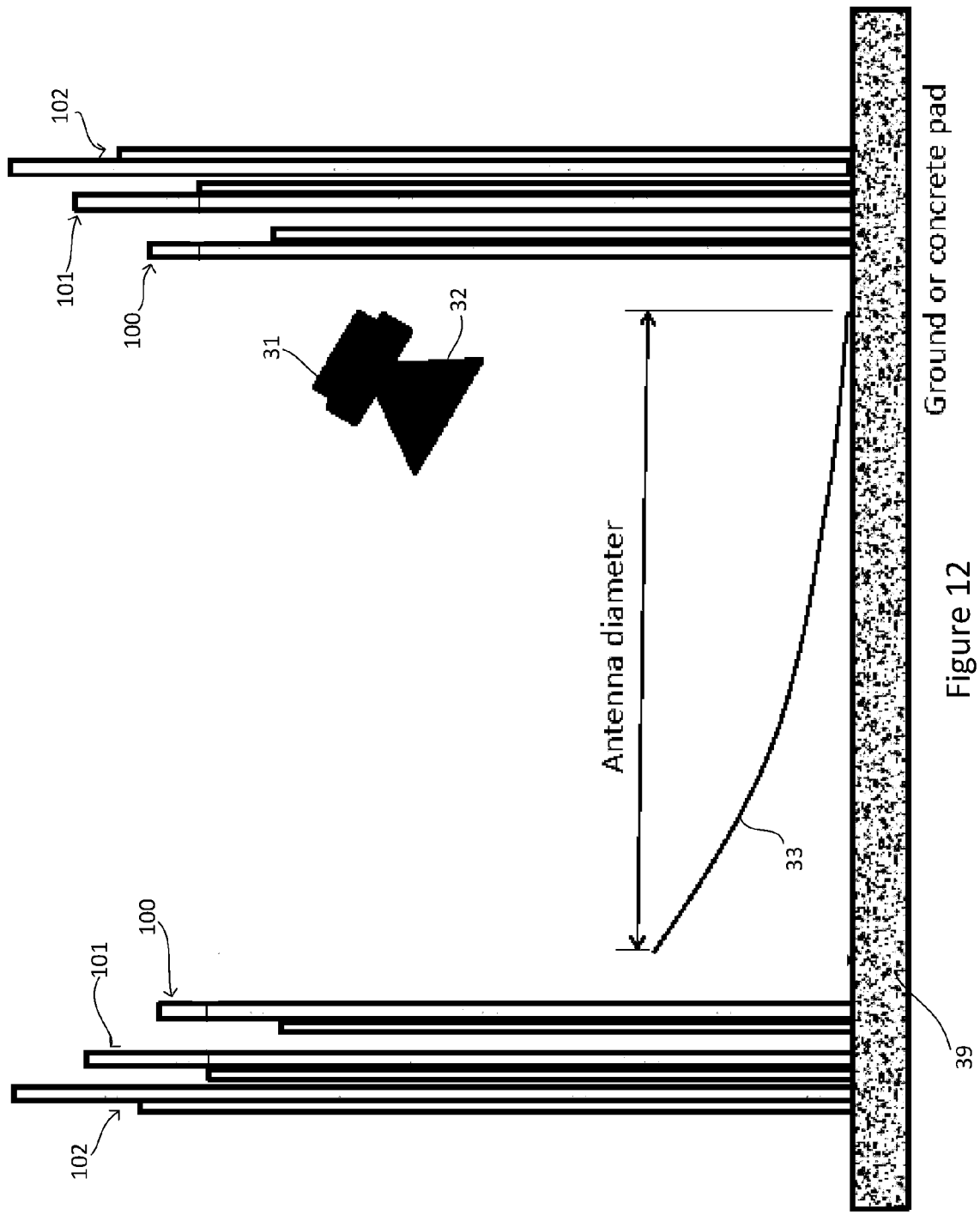
FIG. 12 shows an antenna system for a sodar based wind profiler including a bank of baffles with three baffle stages and three diffraction edges according to another embodiment of the present invention.
Figure 13:
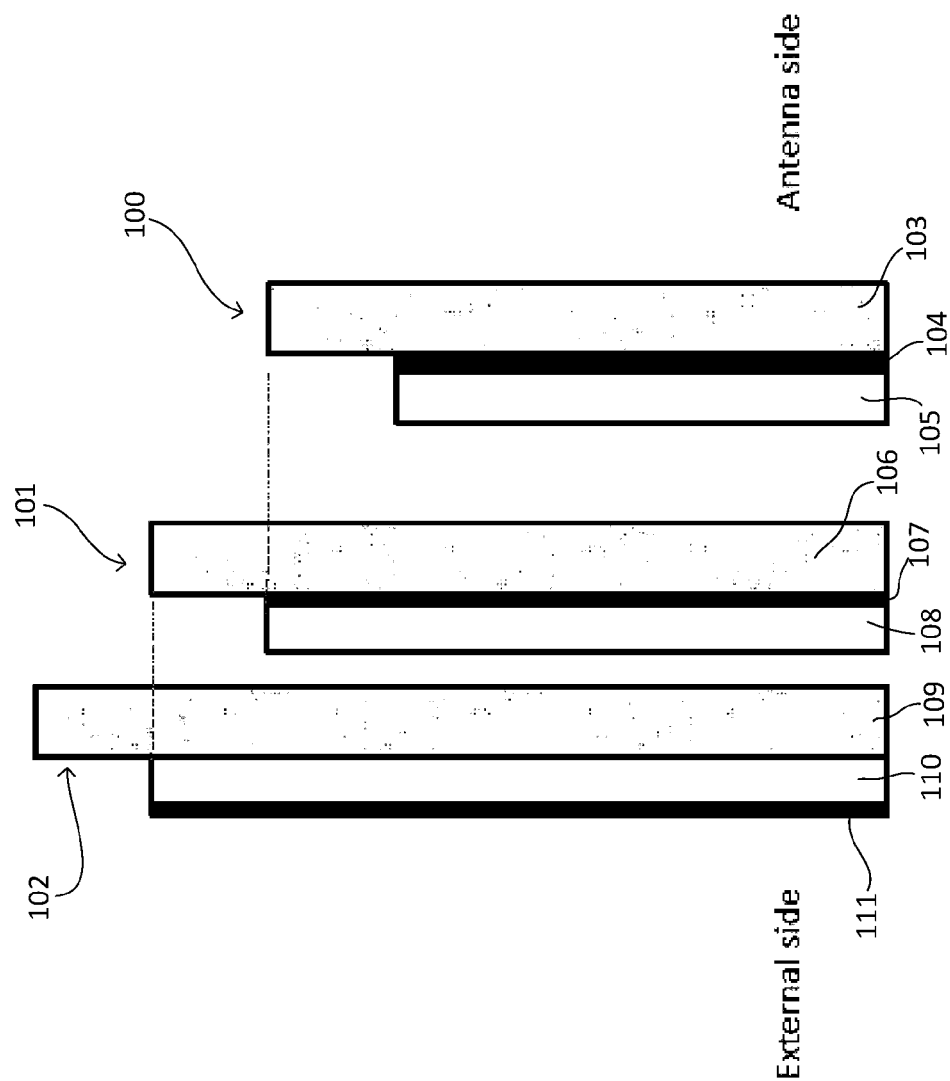
FIG. 13 shows a detailed view (in vertical cross-section) of the bank of baffles in FIG. 10.

FIGS. 12-13 show an antenna system with multiple baffles according to another embodiment of the present invention. The baffles include three nested tubular baffle stages with diffraction management structures for improving performance of the antenna system. The three baffle stages include an inner vertically extending baffle stage 100, an intermediate vertically extending baffle stage 101 and an outer vertically extending baffle stage 102 separated by respective air gaps. The or each air gap may be substantially a half wavelength at the operating frequency.

Inner baffle stage 100 includes a sound absorbing layer 103, a sound attenuating layer 104 and a substrate layer 105. Sound absorbing layer 103 may comprise sound absorbing board such as http://autex.com.au/products/Interior-Acoustics/Quietspace/Panel. In one form sound absorbing layer 103 may be approximately a quarter wavelength thick at the operating frequency. Sound attenuating layer 104 may comprise high density plastics such as high density polyethylene (HDPE). In one form sound attenuating layer 104 may be approximately 5 mm thick.

Substrate layer 105 may provide a support structure for layers 103, 104. Substrate layer 105 may include low density material such as 25 mm×25 mm wooden uprights. In one form substrate layer 105 may be approximately 25 mm thick.

The height of sound attenuating layer 104 may be substantially 1.2 times the diameter of the associated parabolic reflector 33. Sound absorbing layer 103 may be higher than sound attenuating layer 104 to reduce diffraction around inner baffle stage 100. In one form the height of sound absorbing layer 103 may be approximately 120 mm greater than the height of attenuating layer 104 or may be approximately 1.3 times the diameter of associated parabolic reflector 33 to avoid cutting off edges of the antenna beam.

Intermediate baffle stage 101 includes a sound absorbing layer 106, a sound attenuating layer 107 and a substrate layer 108. Sound absorbing layer 106 may comprise sound absorbing board such as http://autex.com.au/products/Interior-Acoustics/Quietspace/Panel. In one form sound absorbing layer 106 may be approximately a quarter of a wavelength thick at the operating frequency. Sound attenuating layer 107 may comprise high density plastics such as high density polyethylene (HDPE). In one form sound attenuating layer 107 may be approximately 5 mm thick.

Substrate layer 108 may provide a support structure for layers 106, 107. Substrate layer 108 may include low density material such as 25 mm×25 mm wooden uprights. In one form substrate layer 108 may be approximately 25 mm thick.

The height of sound attenuating layer 107 may be substantially 1.3 times the diameter of the associated parabolic reflector 33. Sound absorbing layer 106 may be higher than sound attenuating layer 107 to reduce diffraction around intermediate baffle stage 101. In one form the height of sound absorbing layer 106 may be at least one wavelength higher at the operating frequency than the height of absorbing layer 103 or may be approximately 1.4 times the diameter of the associated parabolic reflector 33.

Outer baffle stage 102 includes a sound absorbing layer 109, a substrate layer 110 and a sound attenuating layer 111. Substrate layer 110 may provide a support structure for layer 111. Sound absorbing layer 109 may comprise sound absorbing board as described above. In one form sound absorbing layer 109 may be approximately a quarter of a wavelength thick at the operating frequency. Substrate layer 110 may include low density material such as 25 mm×25 mm wooden uprights. In one form substrate layer 110 may be approximately 25 mm thick. Sound attenuating layer 111 may comprise high density plastics such as high density polyethylene (HDPE). In one form sound attenuating layer 111 may be approximately 5 mm thick. The height of sound absorbing layer 109 may be approximately 1.6 times the diameter of the associated parabolic reflector 33.

Performance of the above bank of baffles when surrounding a transmitter antenna may provide close to 75 dB of attenuation when the transmitted signal is measured at 5 m from the bank of baffles. This may provide sufficient attenuation of a direct transmitted signal to ensure that performance of the associated receiver is not compromised. There may be further attenuation of the directly transmitted signal by a similar bank of baffles surrounding the receiver to provide more than 110 dB total attenuation between the transmitter and receiver. Note that total attenuation may not be a simple sum of the attenuation of the three banks of baffles. Further, the receiver may not suffer degradation from horizontally propagated noise that is less than 80 dBa.

For a bistatic chirp sodar system two absorbing acoustic baffles or baffle banks may be required, namely one acoustic baffle or baffle bank for the transmitter antenna and one acoustic baffle or bank of baffles for the receiver antenna. A baffle bank may include a plurality or series of nested acoustic baffles. Total attenuation from the transmitter to the receiver antennas via two absorbing baffles or baffle banks may be between 45-50 dB which is about 43-38 dB short of the desired 88 dB attenuation as discussed above.

To ensure that a sodar system does not emit too much noise or is subject to external environmental noise, attenuation at each acoustic baffle should exceed 45 dB and preferably should exceed 60 dB.

Attenuation for an individual acoustic baffle=transmit signal level−transmit signal level outside the baffle in a horizontal direction at transmitter to receiver/distance (approximately 4 m).

Figure 14:
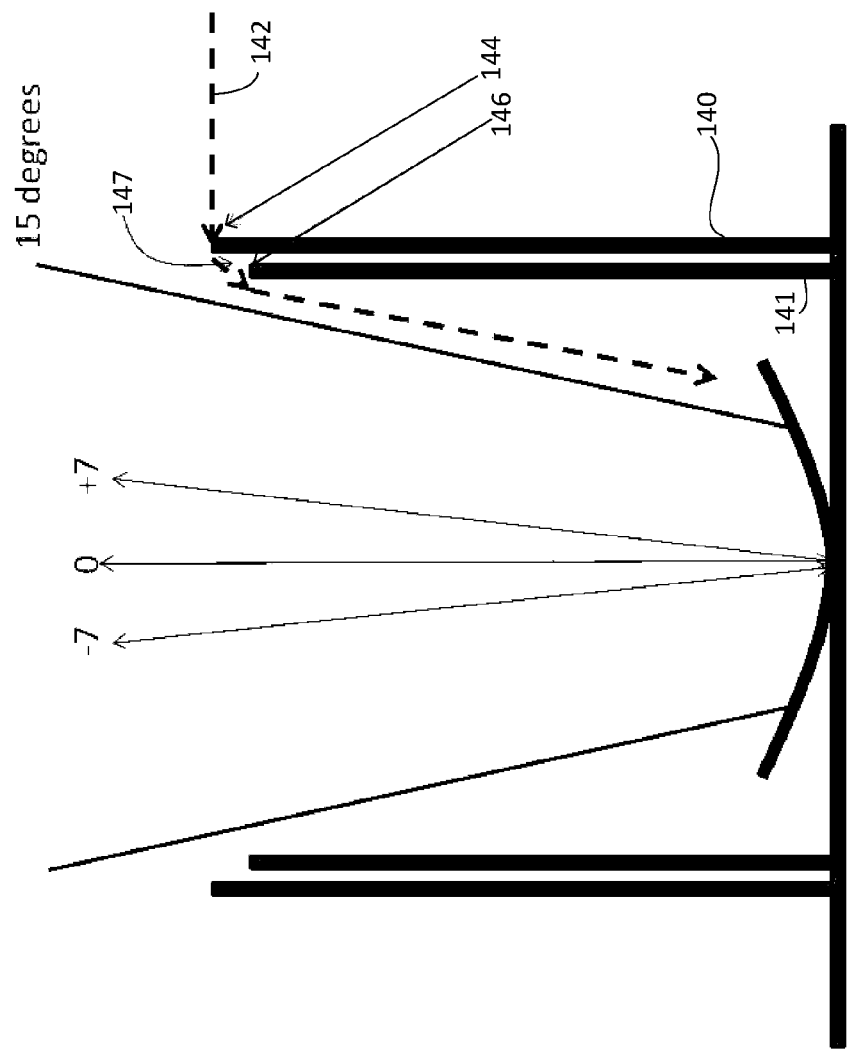
FIG. 14 shows a baffle system with a first diffraction edge, a sound absorbing region, a second diffraction edge and a sound path.
Figure 15:
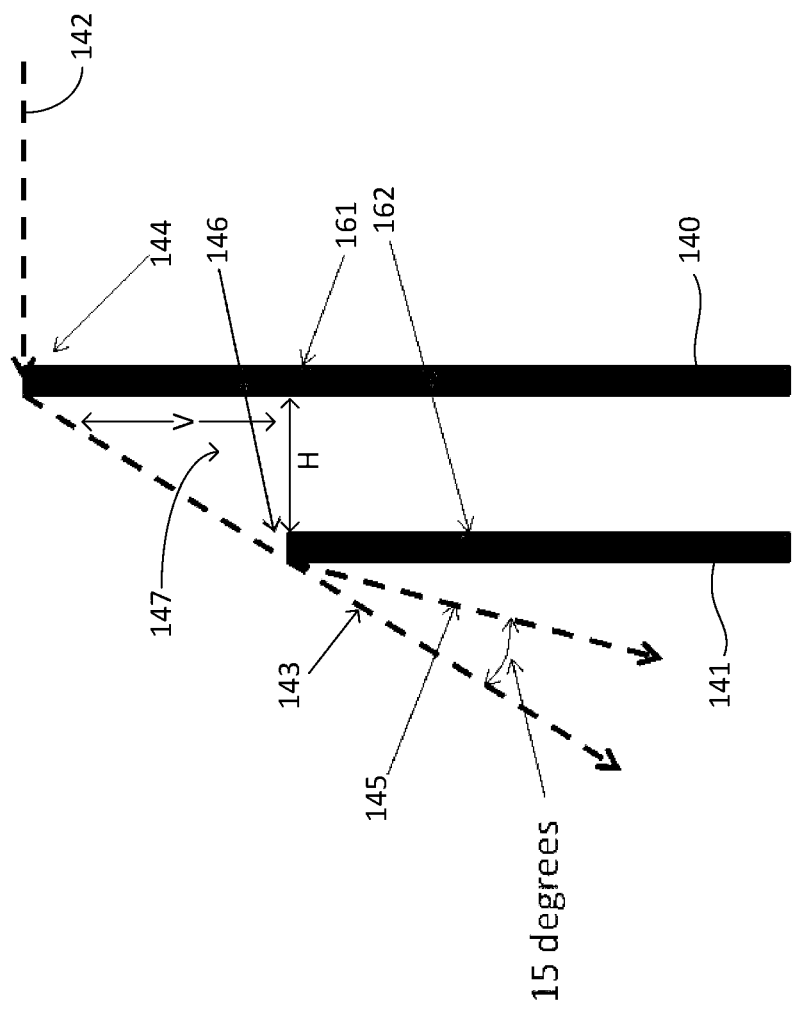
FIG. 15 shows a detailed view of the baffle system of FIG. 14.
Figure 16:
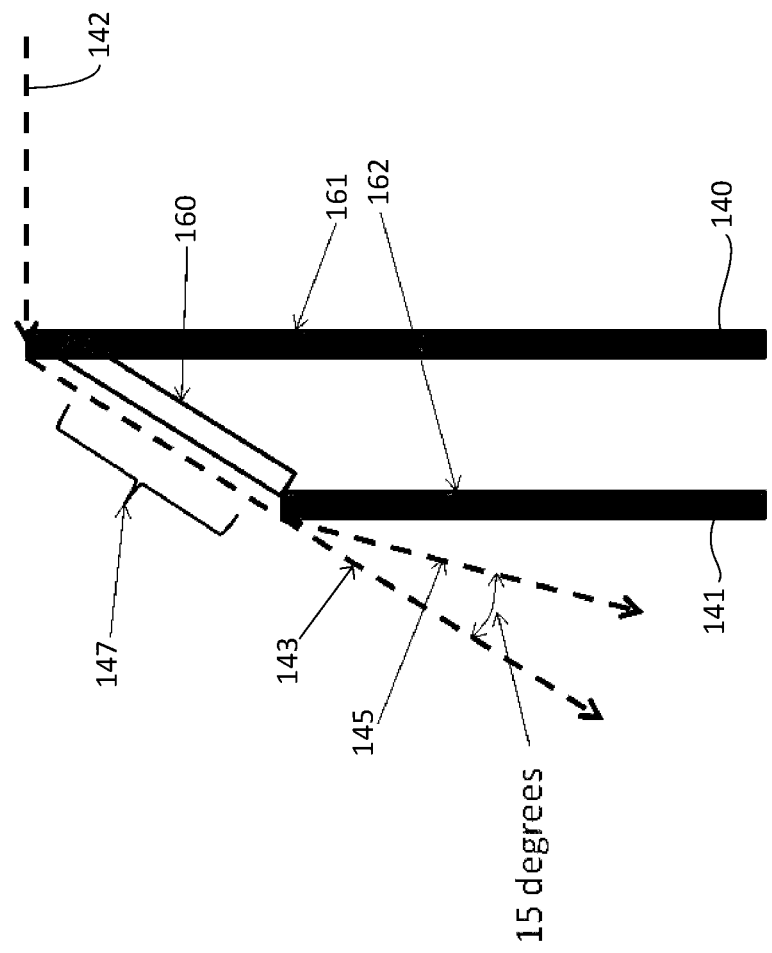
FIG. 16 shows a sound absorbing surface placed between two diffraction edges.

FIGS. 14-16 show a baffle system including two nested baffles 140, 141. In this example sound path 142 undergoes a first diffraction 143 over a first or inner top edge 144 associated with baffle 140 and undergoes a second diffraction 145 over a second or outer top edge 146 associated with baffle 141. The first diffraction 143 bends sound path 142 by 60 degrees from the horizontal and produces 24 dB of attenuation in a horizontal direction (refer FIG. 9B). The second diffraction 145 bends sound path 142 by a further 15 degrees and produces 12 dB of attenuation in a horizontal direction (refer FIG. 9C).

Measurements conducted with a round acoustic baffle equipped with double diffraction edges and a sound containment region indicate that for a transmitted sound level of 130 dBa, signal level outside the acoustic baffle at 4 m distance was at 56 dBa in a horizontal direction indicating that total attenuation across the top edge of the acoustic baffle=130 dBa−56 dBa=74 dB which is substantially (39 dB) better than total attenuation with a single absorbing edge.

However based on FIGS. 9B and 9C an acoustic baffle having first and second diffraction edges as shown in FIGS.

14-15 should yield a total attenuation in a horizontal direction from first and second edges 144, 146 of 24+12=36 dB. Thus there is a shortfall of 74−36=38 dB to be explained.

The shortfall is due in part to additional attenuation or containment of sound due to an interaction at least at some frequencies between first and second diffraction edges 144, 146. Referring to FIG. 15 the interaction appears to take place in a substantial triangular region 147 between first and second edges 144, 146. The triangular region 147 is defined by horizontal separation (H) between first and second diffraction edges 144, 146 and vertical distance (V) between first and second diffraction edges 144, 146. The triangular region 147 will hereinafter be referred to as sound containment region.

The triangular containment region 147 may include a sound absorbing medium 160, such as www.autex.com.au/acoustics/quietspace-panel/ shown in FIG. 16. Sound absorbing layers 161, 162 may be applied to baffles 140, 141. The sound absorbing layers 161, 162 may comprise www.autex.com.au/acoustics/quietspace-panel/.

Analysis suggests that dimensions H, V associated with the (triangular) sound containment region 147 should be greater than half a wavelength at the operating frequency of the sodar system so that absorbing layers 161, 162 may operate as absorbing surfaces rather than reflecting surfaces.

For an operating frequency of 3 KHz, the horizontal separation or gap H may be at least about 60 mm and up to about 75 mm. Likewise, the vertical distance or height difference V may also be at least about 60 mm and preferably more than 120 mm. There will likely be an exponential degradation of attenuation performance of sound containment region 147 as the dimension of horizontal gap H is decreased to zero. Conversely, as the dimension of horizontal gap H is increased beyond half a wavelength there will likely be a point beyond which improvement in performance may be marginal.

Assuming that the horizontal gap H=75 mm as a starting point, where that represents half a wavelength, then an optimum operating frequency range for the sodar system may be between 1.3 KHz and 3.3 KHz centred on 2.3 KHz.

Looked at in another way, outer top edge 144 should be sufficiently high to block (most of) the energy diffracted over inner top edge 146. Preferably outer top edge 144 should be a least a wavelength higher than inner top edge 146, ie. V should be greater than 120 mm (2×60 mm) at the operating frequency (3 KHz) of the sodar system.

As the height difference V between top edges 144, 146 is decreased to zero there will likely be an exponential degradation of attenuation performance of sound containment region 147. Conversely, as the height difference V is increased beyond one wavelength there will likely be a point beyond which improvement in performance may be marginal.

In one preferred embodiment horizontal distance H may be substantially 75 mm and vertical distance V may be substantially 200 mm.

It is believed that the acoustic wave is trapped by sound containment region 147 to provide 33 dB of containment attenuation in the current example. As described above, attenuation of side lobes at an angle of 15 degrees away from the antenna beam centre contributes an additional 5 dB. This gives a total attenuation of 24 dB+12 dB+33 dB+5 dB=74 dB which is substantially in agreement with what is actually measured. The above suggests that any baffle structure that introduces a sound containment region between two horizontally and vertically offset baffle edges may significantly improve attenuation of sound across the top of the baffle structure.

Significantly if two (absorbing) diffraction edges are used without sound containment between the diffraction edges, attenuation of the diffracted sound wave may be significantly reduced to 41 dB (74 dB−33 dB=41 dB). Thus in the case of transmitter and receiver baffles that make use of double diffraction edges without a containment region, total isolation may be reduced to approximately 60 dB, which is not sufficient to provide the preferred level of isolation between the transmitter and receiver of at least 88 dB.

Attenuation of 74 dB across the top of circular acoustic baffles may ensure that the sodar system is not subject to environmental noise and that excess noise is not emitted from the system using these baffles.

Figure 17:
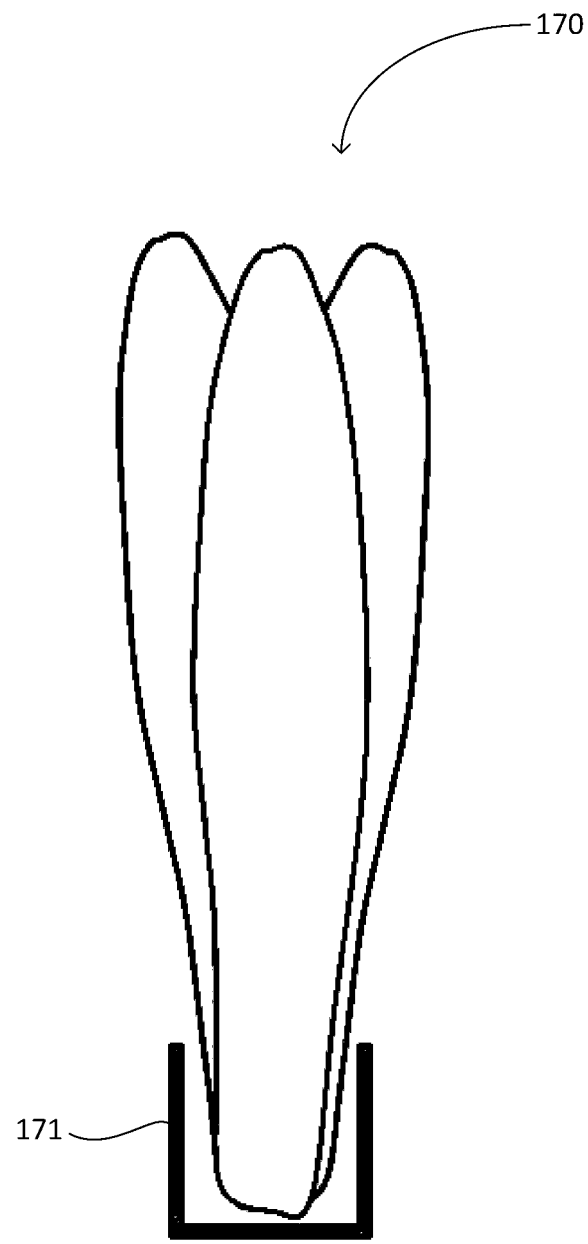
FIG. 17 shows antenna patterns with baffle showing lack of side lobes.

Use of absorbing material on the inside of the acoustic baffles may avoid internal reflections within the baffles that may otherwise reduce its performance. An effective acoustic baffle may minimise or substantially eliminate antenna side lobes as shown in FIG. 17. FIG. 17 reflects the far field beam pattern 170 with an effective acoustic baffle structure 171 in place and an absence of side lobes 77 as shown in FIG. 7.

Figure 18:
FIG. 18 shows an image of a circular baffle with two diffraction edges.

FIG. 18 shows an image of a circular baffle with a first diffraction edge 180, one sound absorbing region 181, a second diffraction edge 182, a triple feed horn 183 and a parabolic reflector 184.

Figure 19:
FIG. 19 shows an image of a square baffle with three diffraction edges.

FIG. 19 shows an image of square baffle with three diffraction edges and two sound absorbing regions, a triple feed horn and a parabolic reflector.

Figure 20:
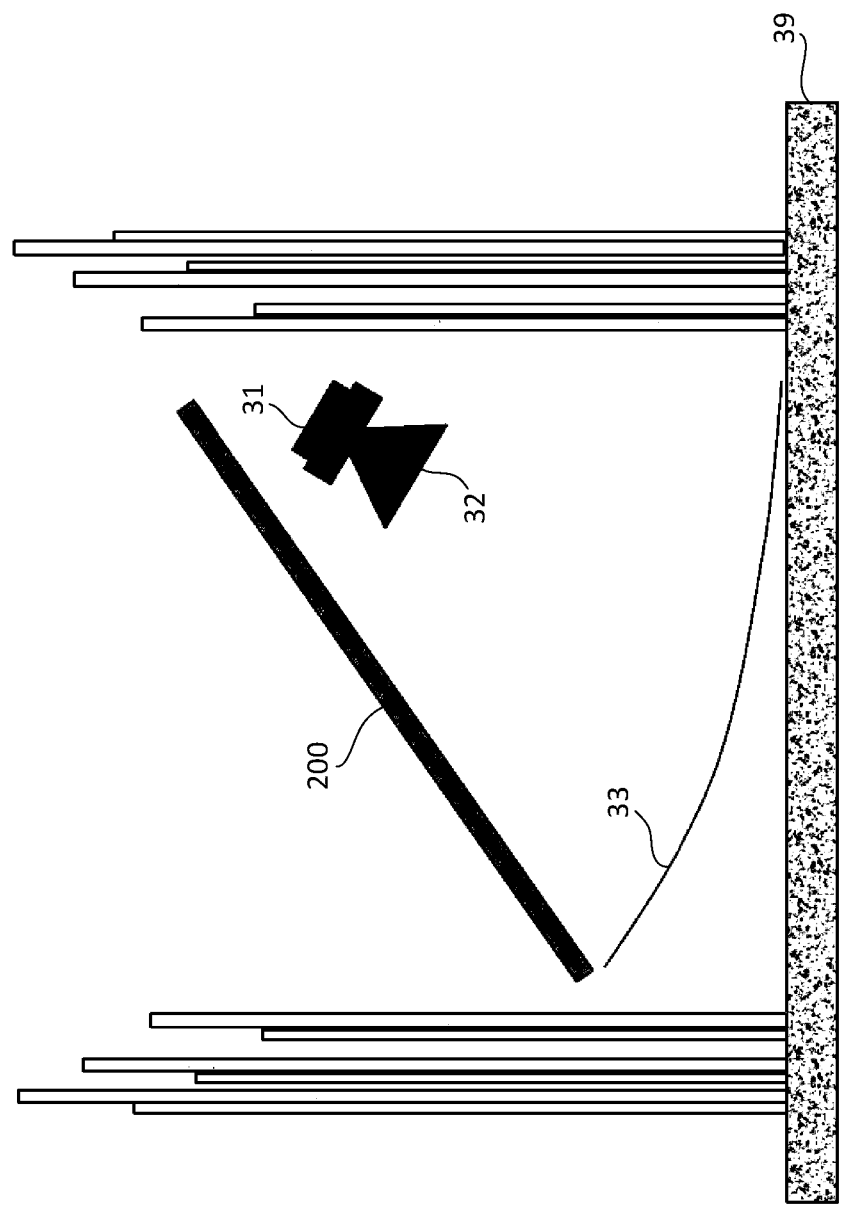
FIG. 20 shows a rain shield placed over a parabolic antenna.
Figure 21:
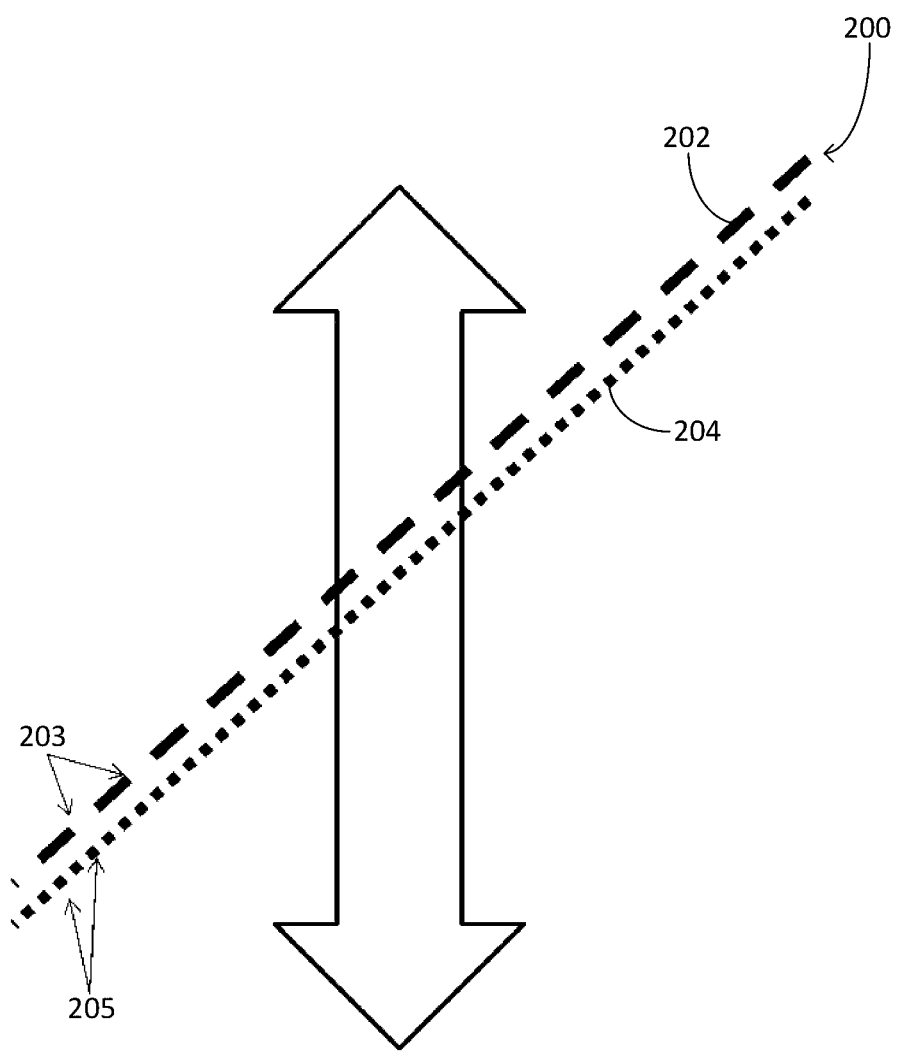
FIG. 21 shows an acoustically transparent rain mesh placed over a parabolic antenna.

As noted above, rain falling on an antenna system including its parabolic reflector or dish may give rise to unwanted noise in the associated acoustic receiver. Rain drops have a typical size around 1 mm in diameter. In order to avoid rain drops from hitting the parabolic reflector, an acoustically transparent rain shield 200 as shown in FIG. 20 may be placed over parabolic reflector 33. Referring to FIG. 21 rain shield 200 may include two layers of mesh, namely a first or upper mesh layer 202 having openings 203 about 1 mm in size and a second or lower mesh layer 204 having openings 205 about 0.2 mm in size. The material used for the two layers of mesh 202, 204 is preferably of metal construction but other (non-metallic) materials may also be used.

A mesh structure as described above may allow a sound pressure wave to pass through the mesh but may prevent rain drops from passing through the structure. Rain drops that hit first mesh 202 are broken up into smaller drops with a much lower vertical velocity. About 50% of the water from the rain drops may cling to and run down first mesh 202. The remaining smaller drops may be captured by second smaller mesh 204 and may run down second mesh 204. Any remaining vertical velocity may be further reduced so that only about 5% of the water from the rain drops may contact parabolic reflectors 33. These very small remaining rain drops have relatively little vertical velocity so that noise from rain drops hitting the antenna dish may be greatly reduced.

Performance of a bistatic sodar based wind profiler may be enhanced by providing an antenna system having one or more characteristics as summarized in table 1 below.

TABLE 1

| SODAR OPERATION | ANTENNA PARAMETER | HOW ACHIEVED |
|---|---|---|
| Isolate transmitted signal from receiver, Minimise external noise in receiver. Minimise acoustic pollution from transmitter. | High attenuation in a horizontal direction is desired. | Use of antenna baffle with multiple diffraction edges and/or sound containment region(s) is desired. |
| Isolate transmitted signal from receiver. Minimise external noise in receiver Minimise acoustic pollution from transmitter. Minimise antenna side lobe beam components that may compromise Doppler performance of system. | Use of low side-lobes in antenna pattern is desired. | Under illuminate parabolic reflector by transducer. Apply internal lining such as an acoustic absorber to antenna baffle. Apply separate diffraction edges to two or more acoustic absorbers which extend beyond periphery of baffle. Use offset feed to parabolic reflector. |
| Maximise level of transmitted signal. Maximise level of received signal. | Use high efficiency transmitter and receiver transducers. | Rely on selection of transducers. |
| Ensure that area from which signals are received is well defined and results in good estimates of Doppler shift from the wind. | Rely on small beam width for transmitter and receiver, | Apply correct selection of diameter for parabolic reflector. |
| Ensure that rain drops do no cause excessive noise in receiver when they hit parabolic reflector antenna. | Use acoustically dead parabolic reflector antenna. | Use rain shield to minimize raindrops hitting parabolic reflector antenna. |
| Obtain multiple offset beams pointing in different directions from the same antenna. | Use multiple transmitter and receiver transducers. | Place multiple transducers close to focal point of antenna. |

Finally, it is to be understood that various alterations, modifications and/or additions may be introduced into the constructions and arrangements of parts previously described without departing from the spirit or ambit of the invention.

The invention claimed is:

1. Apparatus for sounding the atmosphere, said apparatus comprising:
   a transducer for converting an electrical signal to an acoustic wave and/or vice-versa,
   wherein the transducer is adapted to generate a relatively narrow beam width, such as by the use of a parabolic reflector, to transfer the acoustic wave towards the atmosphere, and/or to transfer a reflected acoustic wave from said atmosphere; and
   acoustic isolating structure for isolating or attenuating the acoustic wave such that energy of said acoustic wave transferred in a substantially horizontal direction is reduced below energy of said acoustic wave transferred in a substantially vertical direction by a factor of at least 45 dB;
   wherein said acoustic isolating structure includes an acoustic baffle system for attenuating energy of said acoustic wave transferred in a substantially horizontal direction, said acoustic baffle system including a bank of baffles for attenuating energy of said acoustic wave transferred in a substantially horizontal direction, said acoustic baffle system including at least an inner baffle stage and an outer baffle stage; said acoustic baffle system including a first diffraction edge for providing first attenuation in a substantially horizontal direction and a second diffraction edge for providing second attenuation in a substantially horizontal direction;
   wherein said first diffraction edge and said second diffraction edge are vertically offset with respect to each other.

2. Apparatus according to claim 1, wherein said first attenuation is at least 30 dB in a substantially horizontal direction and said second attenuation is at least 15 dB in a substantially horizontal direction.

3. Apparatus according to claim 1, wherein said acoustic baffle system includes a sound containment region configured to provide third attenuation in a substantially horizontal direction.

4. Apparatus according to claim 3, wherein said sound containment region is located intermediate said first and second diffraction edges.

5. Apparatus according to claim 3, wherein said third attenuation is at least 33 dB in a substantially horizontal direction.

6. Apparatus according to claim 1, wherein each baffle stage includes a sound attenuating layer.

7. Apparatus according to claim 1, wherein each baffle stage includes at least a sound absorbing layer.

8. Apparatus according to claim 1, wherein said electrical signal includes a coded pulse having a pulse compression waveform.

9. A method for sounding the atmosphere comprising:
   generating an acoustic wave;
   transferring the acoustic wave towards the atmosphere;
   receiving a reflected acoustic wave from the atmosphere, and
   isolating or attenuating energy of said acoustic wave transferred in a substantially horizontal direction such that said energy transferred in said substantially horizontal direction is reduced below energy of said acoustic wave transferred in a substantially vertical direction by a factor of at least 45 dB;

wherein said isolating is performed via an acoustic baffle system for attenuating energy of said acoustic wave transferred in a substantially horizontal direction, said acoustic baffle system including a bank of baffles for attenuating energy of said acoustic wave transferred in a substantially horizontal direction, and said acoustic baffle system including at least an inner baffle stage and an outer baffle stage;

said acoustic baffle system including a first diffraction edge for providing first attenuation in a substantially horizontal direction and a second diffraction edge for providing second attenuation in a substantially horizontal direction; wherein said first diffraction edge and said second diffraction edge are vertically offset with respect to each other.

10. A method according to claim 9, wherein said first attenuation is at least 30 dB in a substantially horizontal direction and said second attenuation is at least 15 dB in a substantially horizontal direction.

11. A method according to claim 9, wherein said acoustic baffle system includes a sound containment region configured to provide third attenuation in a substantially horizontal direction.

12. A method according to claim 9, wherein each baffle stage includes a sound attenuating layer.

13. A method according to claim 9, wherein each baffle stage includes at least a sound absorbing layer.

14. A method according to claim 9, wherein acoustic wave is generated from an electrical signal including a coded pulse having a pulse compression waveform.

15. A method according to claim 11, wherein said sound containment region is located intermediate said first and second diffraction edges.

16. A method according to claim 11, wherein said third attenuation is at least 33 dB in a substantially horizontal direction.

* * * * *